United States Patent
Freitas et al.

(10) Patent No.: US 11,163,082 B2
(45) Date of Patent: Nov. 2, 2021

(54) REAL-TIME PATTERN RECOGNITION AND AUTOMATIC INTERPRETATION OF ACOUSTIC REFLECTION IMAGES

(71) Applicant: BAKER HUGHES INCORPORATED, Houston, TX (US)

(72) Inventors: David Freitas, Nova Friburgo RJ (BR); Theodorous Geerits, Nienhagen (DE); Anna Przebindowska, Celle (DE); Alber Tabone Novo, Celle (DE); Martin Tygel, Celle (DE)

(73) Assignee: BAKER HUGHES HOLDINGS LLC, Houston, TX (US)

( * ) Notice: Subject to any disclaimer, the term of this patent is extended or adjusted under 35 U.S.C. 154(b) by 235 days.

(21) Appl. No.: 15/225,417

(22) Filed: Aug. 1, 2016

(65) Prior Publication Data

US 2018/0031718 A1 Feb. 1, 2018

(51) Int. Cl.
*G01V 1/44* (2006.01)
*G01V 1/22* (2006.01)

(52) U.S. Cl.
CPC .............. *G01V 1/44* (2013.01); *G01V 1/22* (2013.01); *G01V 2200/16* (2013.01);
(Continued)

(58) Field of Classification Search
CPC .... G01V 1/46; G01V 1/50; G01V 2210/1299; G01V 2210/74; G01V 2210/72;
(Continued)

(56) References Cited

U.S. PATENT DOCUMENTS 3,069,654 A 12/1962 Hough
3,764,968 A 10/1973 Anderson
(Continued)

FOREIGN PATENT DOCUMENTS

WO 2012161838 A2 11/2012
WO 2015061305 A1 4/2015

OTHER PUBLICATIONS

F. O'Gorman et al, "Finding Picture Edges Through Collinearity of Feature Points," Proceedings of the 3rd Int'l Joint Conference on Artificial Intelligence, pp. 543-555 (1973).
(Continued)

*Primary Examiner* — Ian J Lobo
(74) *Attorney, Agent, or Firm* — Mossman Kumar & Tyler PC

(57) ABSTRACT

Methods, systems, devices, and products for performing well logging in a borehole intersecting an earth formation to obtain and transmit an acoustic reflection image of the formation. Methods include identifying a set of features in the acoustic reflection image substantially fitting a pattern, wherein the set of features corresponds to a portion of at least one reflecting structural interface of the formation; and using a representation of the pattern as the compressed representation of the acoustic reflection image. The features may be amplitude peaks in the acoustic reflection image, and the pattern may be a line segment therein that is obtained from the amplitude peaks. Identifying the set of features may include generating a binary image of the amplitude peaks.

21 Claims, 27 Drawing Sheets

(52) U.S. Cl.
CPC .............. *G01V 2210/1299* (2013.01); *G01V 2210/1429* (2013.01); *G01V 2210/72* (2013.01); *G01V 2210/74* (2013.01)

(58) Field of Classification Search
CPC ........ G01V 1/44; G01V 1/22; G01V 2200/16; G01V 2210/1429
USPC ...................................... 367/28–30, 32, 34
See application file for complete search history.

(56) References Cited

U.S. PATENT DOCUMENTS

| | | | |
|---|---|---|---|
| 3,958,217 | A | 5/1976 | Spinnler |
| 4,351,037 | A | 9/1982 | Scherbatskoy |
| 4,953,595 | A | 9/1990 | Kotlyar |
| 5,031,155 | A | 7/1991 | Hsu |
| 5,162,994 | A * | 11/1992 | Torres .................. G01V 1/44 324/339 |
| 5,960,371 | A * | 9/1999 | Saito .................... G01V 1/50 702/10 |
| 5,995,447 | A * | 11/1999 | Mandal ................. G01V 1/44 181/106 |
| 6,614,360 | B1 | 9/2003 | Leggett, III et al. |
| 6,898,150 | B2 | 5/2005 | Hahn et al. |
| 7,035,165 | B2 | 4/2006 | Tang |
| 7,136,510 | B2 * | 11/2006 | Van Ginkel ............ G01V 1/50 382/109 |
| 7,417,920 | B2 | 8/2008 | Hahn et al. |
| 8,055,448 | B2 | 11/2011 | Mathiszik et al. |
| 2005/0192753 | A1 | 9/2005 | Wang .................... G01V 9/00 702/11 |
| 2007/0097786 | A1 * | 5/2007 | Wu ..................... G01V 11/002 367/31 |
| 2008/0151690 | A1 | 6/2008 | Tang et al. |
| 2009/0192711 | A1 * | 7/2009 | Tang .................... E21B 47/12 702/6 |
| 2009/0205899 | A1 | 8/2009 | Geerits et al. |
| 2011/0091078 | A1 * | 4/2011 | Kherroubi ............ G01V 11/00 382/109 |
| 2011/0221883 | A1 * | 9/2011 | Johnston ............... G01V 1/46 348/85 |
| 2014/0219054 | A1 | 8/2014 | Mousa et al. |
| 2014/0269186 | A1 | 9/2014 | Tegtmeier-Last et al. |
| 2014/0362664 | A1 | 12/2014 | Stolpman et al. |
| 2015/0013974 | A1 | 1/2015 | Mekic et al. |
| 2015/0049585 | A1 * | 2/2015 | Collins ................. G01V 1/50 367/35 |
| 2015/0098627 | A1 * | 4/2015 | Ye ....................... E21B 49/00 382/109 |
| 2015/0109886 | A1 | 4/2015 | Mekic et al. |
| 2016/0041287 | A1 * | 2/2016 | Merciu ................. E21B 47/005 367/25 |
| 2018/0003843 | A1 * | 1/2018 | Hori .................... E21B 47/0005 |

OTHER PUBLICATIONS

M. Cohen et al., "On the Detection of Structures in Noisy Picturesw," School of Computer Science, McGill University (1977).
J. Canny, "A Computational Approach to Edge Detection," IEEE Trans. Pattern Anal. Mach. Intell, pp. 679-698 (1986).
Irwin Sobel, et al., "A 3×3 Isotropic Gradient Operator for Image Processing," (1986).
D.A. Forsyth, et al., "Computer Vision: A Modern Approach," Prentice Hall Professional Technical Reference, p. 217 (2002).
Christopher M. Bishop, "Pattern Recognition an Machine Learning," Part 1, pp. 1-25, Springer-Verlag, NY, NY (2006).
Christopher M. Bishop, "Pattern Recognition an Machine Learning," Part 2, pp. 26-50, Springer-Verlag, NY, NY (2006).
Christopher M. Bishop, "Pattern Recognition an Machine Learning," Part 3, pp. 51-75, Springer-Verlag, NY, NY (2006).
Christopher M. Bishop, "Pattern Recognition an Machine Learning," Part 4, pp. 76-100, Springer-Verlag, NY, NY (2006).
Christopher M. Bishop, "Pattern Recognition an Machine Learning," Part 5, pp. 101-125, Springer-Verlag, NY, NY (2006).
Christopher M. Bishop, "Pattern Recognition an Machine Learning," Part 6, pp. 126-141, Springer-Verlag, NY, NY (2006).
Christopher M. Bishop, "Pattern Recognition an Machine Learning," Part 7, pp. 142-156, Springer-Verlag, NY, NY (2006).
D. Salomon et al, "Handbook of Data Compression," Springer Science & Business Media (Introduction only) (2010).
Saket Bhardwaj et al., "A Survey on Various Edge Detector Techniques," Procedia Technology, pp. 220-226 (2011).
Suxia Cui et al., "Image Processing Techniques in Shockwave Detection and Modeling," Jnl of Signal and Info Processing, vol. 4, pp. 109-113 (2013).
Int'l Search Report and Written Opinion in PCT/US2016/036842, dated Sep. 22, 2016.
Said, B., "Robust curve detection using Hough Transform applied to fracture detection in electric borehole images," M. Sc Thesis, FMS/FMI, Universitat Munchen, Munich (2014).
Duda, Richard O. et al., "Use of the Hough Transformation to Detect Lines and Curves in Pictures," ACM vol. 15, No. 1, pp. 11-15 (1972).
Van Veen, T.M., et al., "Discretization Errors in the Hough Transform," Pattern Recognition PR, 137-145 (1981).
Illingworth, J., et al., "A Survey of the Hough Transform," Computer Vision, Graphics, & Image Processing 44, 87-116 (1988).
Galamhos, C., et al., "Progressive Probabilistic Hough Transform for Line Detection," Computer Vision and Pattern Recognition, pp. 554-560 (1999).
Fiala, Mark, "Identify and Remove Hough Transform Method," Computational Video Group, Nat'l Research Council, Ottawa, CA (2003).
Van Ginkel, M. et al., "A Short Introduction to the Radon and Hough Transforms and How They Related to Each Other," Delft Univ of Technology, Quantitative Imaging Group Technical Report Series No. QI-2004-01 (2004).
Manzanera, Antoine, "Dense Hough Transforms on Gray Level Images Using Multi-Scale Derivatives," 6th Int'l Workshop on Medical and Healthcare Applications (2012).
Xu, Zezhong et al., "Determination of Length and Width of a Line-segment by Using a Hough Transform," Geometry for Computer Imagery, pp. 190-201 (2014).

* cited by examiner

K-means cluster:
First iteration

K-means cluster:

Second iteration

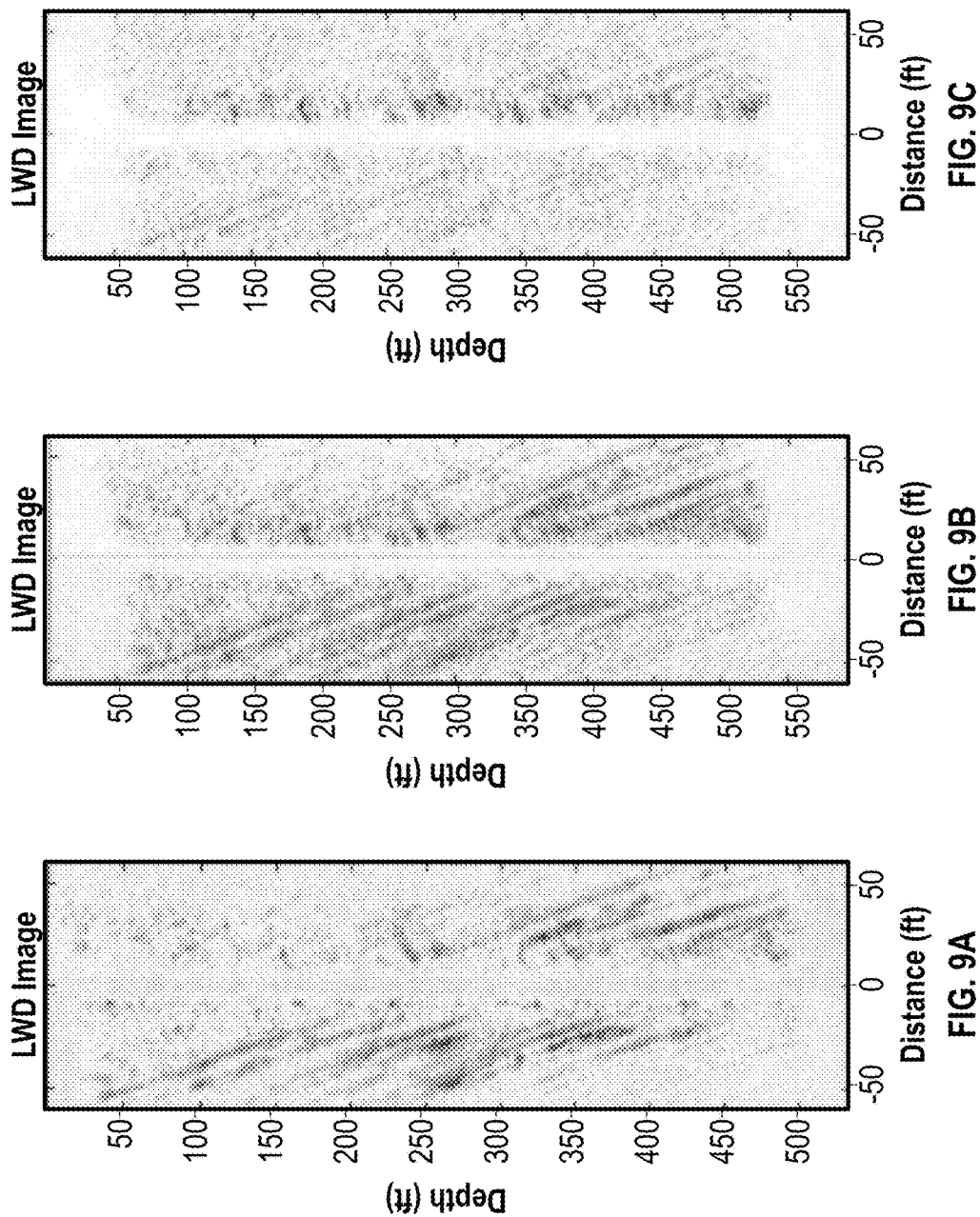

REAL-TIME PATTERN RECOGNITION AND AUTOMATIC INTERPRETATION OF ACOUSTIC REFLECTION IMAGES

FIELD OF THE DISCLOSURE

This disclosure generally relates to borehole tools, and in particular to methods and apparatuses for conducting acoustic well logging.

BACKGROUND OF THE DISCLOSURE

Drilling wells for various purposes is well-known. Such wells may be drilled for geothermal purposes, to produce hydrocarbons (e.g., oil and gas), to produce water, and so on. Well depth may range from a few thousand feet to 25,000 feet or more. In hydrocarbon wells, downhole tools often incorporate various sensors, instruments and control devices in order to carry out any number of downhole operations. Thus, the tools may include sensors and/or electronics for formation evaluation, monitoring and controlling the tool itself, and so on.

Drilling systems having an acoustic measurement-while-drilling ("MWD") system as part of a bottomhole assembly, or an after-drilling wireline logging system having an acoustic device for measuring acoustic velocities of subsurface formations, during or after drilling of the wellbores and determining the location of formation bed boundaries around the bottomhole assembly, as in the MWD system, or around the wireline logging system are well known. Tools for imaging of bed boundaries using directional acoustic sources are also known.

For the purposes of this disclosure, the term "bed boundary" is used to denote a geologic bed boundary, interface between layers having an acoustic impedance contrast, or a subsurface reflection point.

SUMMARY OF THE DISCLOSURE

In aspects, the present disclosure is related to methods and apparatus for estimating at least one downhole parameter relating to an earth formation intersected by a borehole. Aspects of the present disclosure relate to performing acoustic well logging in a borehole intersecting an earth formation and automatically generating a compressed representation of an acoustic reflection image obtained in the logging.

Methods may include identifying a set of features in the acoustic reflection image substantially fitting a pattern, wherein the set of features corresponds to a portion of at least one reflecting structural interface of the formation; and using a representation of the pattern as the compressed representation of the acoustic reflection image. The features may be amplitude peaks in the acoustic reflection image, and the pattern may be a line segment therein that is obtained from the amplitude peaks. Identifying the set of features may include generating a binary image of the amplitude peaks. The pattern may be encoded by at least one of: i) a Hough transformation; ii) a modification of the Hough transformation.

Identifying the set of features in the acoustic reflection image substantially fitting the pattern may include determining an envelope of the acoustic reflection image in a determined strike direction and finding dominant peaks in the envelope. The dominant peaks may be found by a peak detection algorithm using automated global thresholding (e.g., k-means). The acoustic reflection image may be obtained from an original acoustic reflection image via the application of a 2-D spatial wavenumber filter. The acoustic reflection image may be obtained from an original acoustic reflection image via the application of a 2-D spatial wavenumber filter automatically generated as a polar segment within the 2-D spatial wavenumber amplitude spectrum of at least a portion of the original acoustic reflection image, and wherein an azimuthal orientation of the polar segment defines the determined strike.

Methods may include compressing the representation of the pattern. Methods may include transmitting the compressed acoustic reflection image uphole. Methods may include receiving the compressed image at the surface in near real-time with respect to initiation of the transmitting. Methods may include obtaining the acoustic reflection image with an acoustic well logging tool.

In other general embodiments, automatically generating a compressed representation of an acoustic reflection image may be carried out by: identifying a set of features in the acoustic reflection image by characterizing portions of the image meeting at least one predefined characteristic as a first type and characterizing other portions of the image failing to meet the at least one predefined characteristic as a second type, wherein the set of features corresponds to a portion of at least one reflecting structural interface of the formation; and generating a binary image by representing the first type with first regions of the image and representing the second type with second regions of the image; and using a representation of the binary image as the compressed representation of the acoustic reflection image. The at least one predefined characteristic may comprise an amplitude peak. Methods may include compressing the representation to generate the compressed acoustic reflection image.

General apparatus embodiments include a well logging system in accordance with the present disclosure for logging in a borehole intersecting an earth formation. The apparatus may include an acoustic logging tool configured to be conveyed into a borehole; a transmitter on the tool configured to generate a first wave in the earth formation; at least one receiver on the tool configured to provide a signal responsive to at least one reflecting structural interface of the formation of the first wave by an interface in the formation; and at least one processor on the tool configured to generate an acoustic reflection image from the signal and automatically generate a compressed representation of the acoustic reflection image. Automatically generating the compressed representation of the acoustic reflection image may be carried out by: identifying a set of features in the acoustic reflection image substantially fitting a pattern, wherein the set of features corresponds to a portion of the at least one reflecting structural interface of the formation; and using a representation of the pattern as the compressed representation of the acoustic reflection image.

The features may be amplitude peaks in the acoustic reflection image, and the pattern may be a line segment therein that is obtained from the amplitude peaks. The at least one processor may be configured to identify the set of features by generating a binary image of the amplitude peaks. The pattern may be encoded by at least one of: i) a Hough transformation; ii) a modification of the Hough transformation. The at least one processor may be configured to identify the set of features in the acoustic reflection image substantially fitting the pattern by determining an envelope of the acoustic reflection image in a determined strike direction and finding dominant peaks in the envelope.

Examples of some features of the disclosure may be summarized rather broadly herein in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein:

FIGS. 9A-9C illustrates acoustic reflection images resulting from three variations in pre-processing technique for a dataset presenting dipping events.

DETAILED DESCRIPTION

Figure 1A:
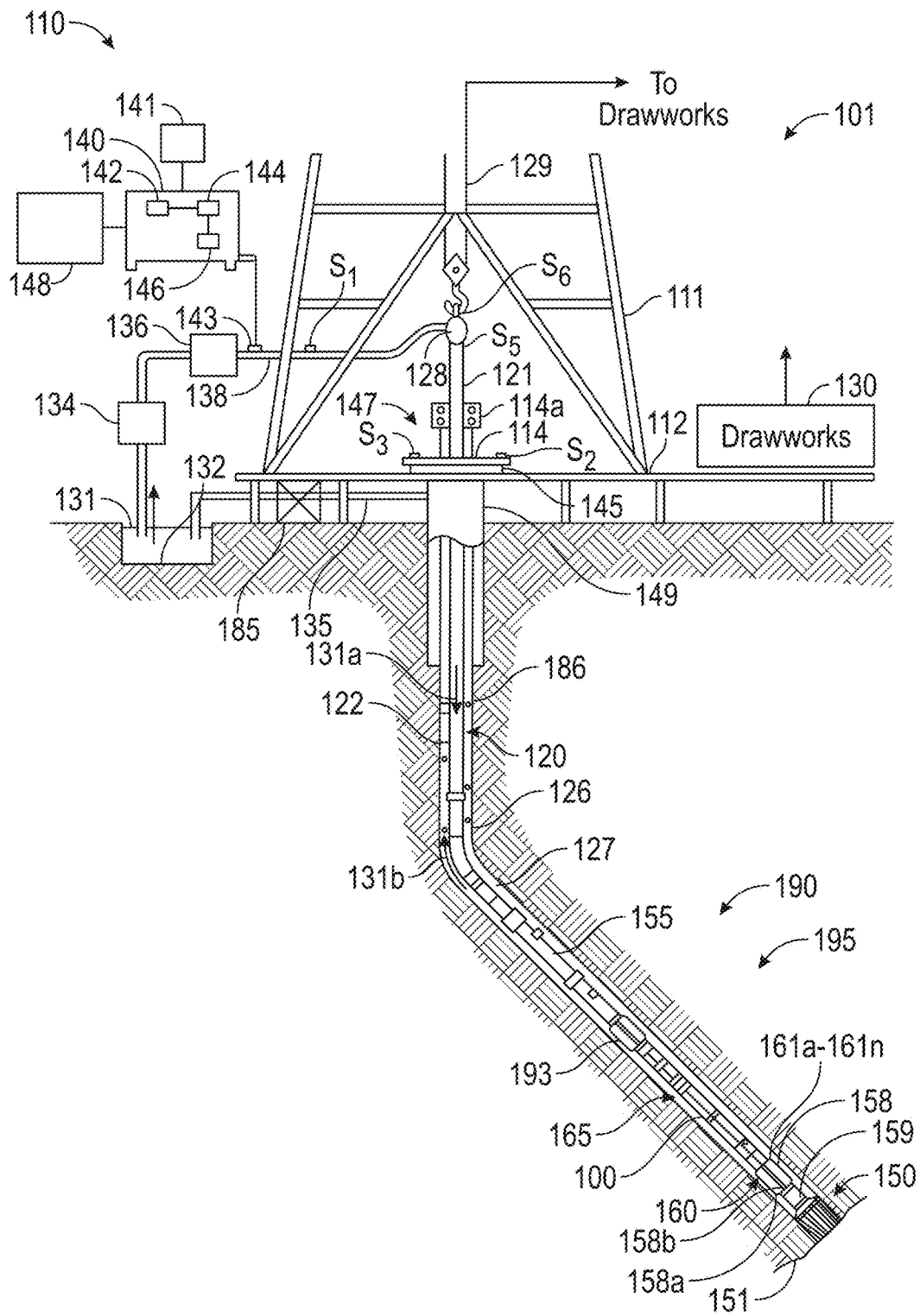
FIGS. 1A-1C show schematic diagrams illustrating an example drilling system in accordance with embodiments of the disclosure.

Aspects of the present disclosure relate to apparatus and methods for acoustic well logging, including measurement and interpretation of physical phenomena indicative of parameters of interest of the formation, the borehole, or the downhole fluids therein. Techniques described herein are particularly suited to compression of acoustic reflection images downhole for transmission to the surface for recording, display, or further processing.

To obtain hydrocarbons such as oil and gas, boreholes (wellbores) are drilled through hydrocarbon-bearing subsurface formations. A large number of the current drilling activity involves drilling "horizontal" boreholes. Advances in logging-while-drilling and measurement-while-drilling (LWD/MWD) measurement systems and drill bit steering systems (disposed on a drill string) enable drilling of horizontal boreholes with enhanced efficiency and greater success. Recently, horizontal boreholes, extending several thousand meters ("extended reach" boreholes), have been drilled to access hydrocarbon reserves at reservoir flanks and to develop satellite fields from existing offshore platforms. Even more recently, attempts have been made to drill boreholes corresponding to three-dimensional borehole profiles. Such borehole profiles often include several builds and turns along the drill path. Such three-dimensional borehole profiles allow hydrocarbon recovery from multiple formations and allow optimal placement of wellbores in geologically intricate formations.

Hydrocarbon recovery may be maximized by drilling the horizontal and complex wellbores along optimal locations within the hydrocarbon-producing formations (payzones). Important to the success of these wellbores is to: (1) establish reliable stratigraphic position control while landing the wellbore into the target formation, and (2) properly navigate the drill bit through the formation during drilling. In order to achieve such wellbore profiles, it is important to determine the true location of the drill bit relative to the formation bed boundaries and boundaries between the various fluids, such as oil, gas and water. Lack of such information can lead to severe "dogleg" paths along the borehole resulting from hole or drill path corrections to find or to reenter the payzones. Such wellbore profiles usually limit the horizontal reach and the final wellbore length exposed to the reservoir.

Optimization of the borehole location within the formation can also have a substantial impact on maximizing production rates and minimizing gas and water coning problems. Steering efficiency and geological positioning are considered in the industry among the greatest limitations of the current drilling systems for drilling horizontal and complex wellbores. Availability of relatively precise three-dimensional subsurface acoustic (e.g., seismic) maps and location information for the drilling assembly relative to the bed boundaries of the formation around the drilling assembly can greatly enhance the chances of drilling boreholes for maximum recovery.

An acoustic logging tool, such as an LWD or MWD acoustic tool, may produce acoustic signals and subsequently record refracted and reflected signals of full wave modes (P, S and Stoneley) in its memory. For a number of reasons, in drilling-based systems mud-pulse telemetry is the most widely used method of communication with the surface. The main refracted wave logs (e.g., slowness logs) dataset can be easily sent to surface in real time due to the dataset's relatively small size.

Unfortunately, however, acoustic reflection images (that is, datasets comprising reflection data sufficient to characterize a boundary in the formation) are significantly larger. In practice, it has not been possible to send the reflection images to the surface for real-time applications due to limitations of mud pulse telemetry speed. Therefore, efficient processing and compression of acoustic reflection image data for transmission to the surface, and particularly techniques for compression sufficient to enable the use of such data for real-time use (e.g., geosteering), would be desirable.

For real-time control and utilization of acoustic reflection images, the compression algorithm should be able to process and compress the acoustic data in such a way that each data unit of data sufficient for utilization is transmitted faster than the rate of penetration ('ROP') of the tool.

An LWD acoustic logging tool may acquire good acoustic records at ROPs of up to 100 feet per hour. Acoustic reflection imaging over the same interval may produce more than a half million bits of data. Mud pulse telemetry may operate on an average transmission rate of 10 bits/sec. However, the bandwidth is typically shared with other tools in the borehole.

Thus, typical available bandwidth for acoustic reflection data is between 2 and 5 bits per second. Even at 10 bits/second, sending the uncompressed acoustic reflection data from the borehole to the surface would take more than 17 hours. Thus, substantial compression of acoustic reflection data is highly desirable.

Generally speaking, the objective of data compression is to discard irrelevant and/or redundant parts of the data for efficient transmission. Compression may be lossless or lossy. Lossless compression reduces the redundancy of the data, being generally independent of the nature of the data. Lossless compressed data can be recovered quite well. An example of lossless compression algorithm is Entropy Coding (see, e.g., Salomon et al., 2010). Lossy compression reduces, besides redundancy, also irrelevant parts of the data. Depending on how irrelevancy is implemented, the process may lead to a lower-quality version of the original data. An example of a lossy compression technique is Transform Coding and Quantization (see, e.g., Salomon et al., 2010).

Efficient methods of lossy data compression are commonly based on a combination of the following steps: 1) pre-processing (if necessary), 2) transform coding, 3) quantization and 4) entropy coding. This scheme can significantly reduce data size, but depending on the amount of data reduction, relevant information from the original data may be lost, and the remaining compressed data may lack sufficient resolution for downhole applications. As an example of lossy image compression, the Joint Photographic Experts Group ('JPEG') standard is well-known and uses each of the above steps: pre-processing with color space transformation to improve compression by statistical de-correlation; transform coding using discrete cosine transform or discrete wavelet transform; quantization using a quantization matrix based on human-eye capacity to distinguish the strength of high-frequency brightness variations; and entropy coding using run-length encoding and Huffman coding (see, e.g., Salomon et al., 2010). Using conventional image compression algorithms, compression sufficient to enable transmission of an image in under an hour (e.g., at about 3 percent quality) results in an unusable image after decompression.

Assuming that the acoustic reflection image data could be transmitted at a rate of 5 bits per second, it would take approximately 35 hours for 640 kilobits to be transmitted to the surface. Such large transmission times are incompatible with geosteering and other real-time applications. Therefore, more intelligent compression algorithms sufficient in terms of both data quality and expressive data size reduction would be desirable.

Aspects of the present disclosure relate to methods for performing well logging in a borehole intersecting an earth formation using smart compression. Methods may include automatically generating a compressed representation of an acoustic reflection image. The compressed representation may be generated by: identifying a set of features in the acoustic reflection image substantially fitting a pattern; and using a representation of the pattern as the compressed representation of the acoustic reflection image. The set of features may correspond to a portion of at least one reflecting structural interface of the formation.

Aspects of the disclosure may identify, by means of pattern recognition, the relevant information contained in the image, so that only irrelevant information of that image is removed in the process. In this case, the nature of the data collected is important to successful compression. Meaningful information may be attached to reflector structures and fractures near the borehole.

Acoustic Reflection Imaging

Aspects of the present disclosure relate to using at least one acoustic sensor as part of a downhole acoustic well logging tool to produce acoustic information responsive to an acoustic wave from the earth formation. The sensor may include at least one acoustic transmitter and at least one acoustic receiver disposed on a carrier in the borehole. The receiver and transmitter may be implemented as the same transducer, different transducers, or one or more transducer arrays. The information is indicative of a parameter of interest. The term "information" as used herein includes any form of information (analog, digital, EM, printed, etc.), and may include one or more of: raw data, processed data, and signals.

Methods may include estimating a parameter of interest from the information, evaluating the formation using the parameter of interest, and/or performing further borehole or formation operations in dependence upon the evaluation or the parameter of interest. In particular embodiments, a state of drilling operations, characteristics of the borehole or formation, or orientation of components of the downhole tool may be estimated using the parameter of interest, and then used in performing an operation as described above.

Aspects of the present disclosure are subject to application in various different embodiments. The carrier may be a drill string, coiled tubing, a slickline, an e-line, a wireline, etc. Downhole tools may be coupled or combined with additional tools, including, e.g., some or all the information processing system, as shown in FIG. 1C, discussed in further detail below. In some general embodiments, a carrier is implemented as a tool string of a drilling system, and the acoustic wellbore logging may be characterized as "logging-while-drilling" (LWD) or "measurement-while-drilling" (MWD) operations. As described herein, "borehole" or "wellbore" refers to a single hole that makes up all or part of a drilled well. Depending on the configuration, the system 101 may be used during drilling and/or after the wellbore 112 has been formed, including, in some instances after the installation of casing or production infrastructure. While a land system is shown, the teachings of the present disclosure may also be utilized in offshore or subsea applications. As described herein, "formations" refer to the various features and materials that may be encountered in a subsurface environment and surround the borehole. The term "information" includes, but is not limited to, raw data, processed data, and signals.

Figure 1B:
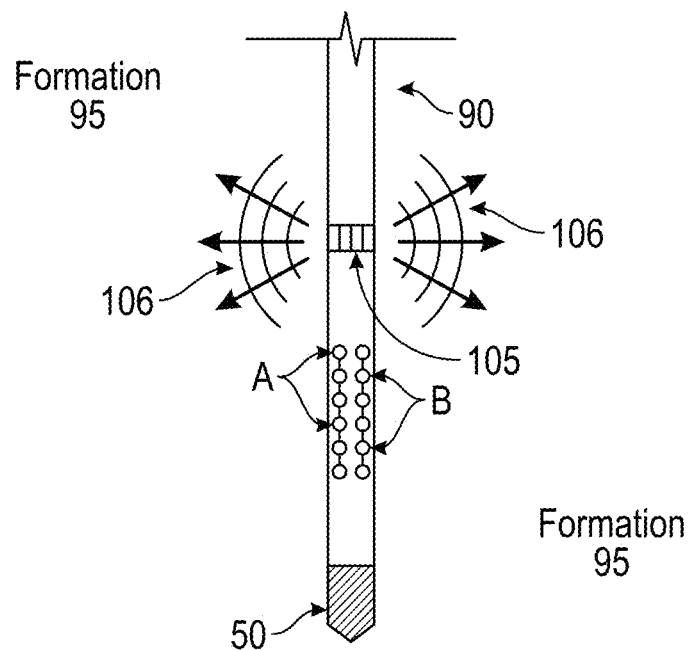
Figure 1C:
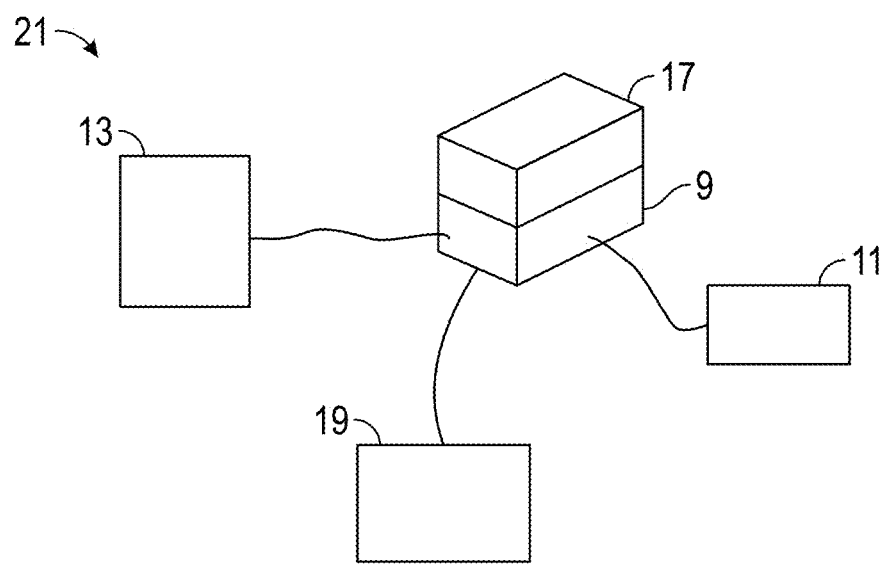

FIG. 1A is a schematic diagram of an example drilling system 101 according to embodiments of the disclosure. FIG. 1B shows a drill string 120 that includes a bottomhole assembly (BHA) 190 conveyed in a borehole 126. The drilling system 101 includes a conventional derrick 111 erected on a platform or floor 112 which supports a rotary table 114 that is rotated by a prime mover, such as an electric motor (not shown), at a desired rotational speed. A tubing (such as jointed drill pipe 122), having the drilling assembly 190, attached at its bottom end extends from the surface to the bottom 151 of the borehole 126. A drill bit 150, attached to drilling assembly 190, disintegrates the geological formations when it is rotated to drill the borehole 126. The drill string 120 is coupled to a drawworks 130 via a Kelly joint 121, swivel 128 and line 129 through a pulley. Drawworks 130 is operated to control the weight on bit ("WOB"). The drill string 120 may be rotated by a top drive (not shown) instead of by the prime mover and the rotary table 114. Alternatively, a coiled-tubing may be used as the tubing 122. A tubing injector 114a may be used to convey the coiled-tubing having the drilling assembly attached to its bottom end. The operations of the drawworks 130 and the tubing injector 114a are known in the art and are thus not described in detail herein.

A suitable drilling fluid 131 (also referred to as the "mud") from a source 132 thereof, such as a mud pit, is circulated under pressure through the drill string 120 by a mud pump 134. The drilling fluid 131 passes from the mud pump 134 into the drill string 120 via a desurger 136 and the fluid line 138. The drilling fluid 131a from the drilling tubular discharges at the borehole bottom 151 through openings in the drill bit 150. The returning drilling fluid 131b circulates uphole through the annular space 127 between the drill string 120 and the borehole 126 and returns to the mud pit 132 via a return line 135 and drill cutting screen 185 that removes the drill cuttings 186 from the returning drilling fluid 131b. A sensor S1 in line 138 provides information about the fluid flow rate. A surface torque sensor S2 and a sensor S3 associated with the drill string 120 respectively provide information about the torque and the rotational speed of the drill string 120. Tubing injection speed is determined from the sensor S5, while the sensor S6 provides the hook load of the drill string 120.

Well control system 147 is placed at the top end of the borehole 126. The well control system 147 includes a surface blow-out-preventer (BOP) stack 115 and a surface choke 149 in communication with a wellbore annulus 127. The surface choke 149 can control the flow of fluid out of the borehole 126 to provide a back pressure as needed to control the well.

In some applications, the drill bit 150 is rotated by only rotating the drill pipe 122. However, in many other applications, a downhole motor 155 (mud motor) disposed in the BHA 190 also rotates the drill bit 150. The rate of penetration (ROP) for a given BHA largely depends on the WOB or the thrust force on the drill bit 150 and its rotational speed.

A surface control unit or controller 140 receives signals from the downhole sensors and devices via a sensor 143 placed in the fluid line 138 and signals from sensors S1-S6 and other sensors used in the system 101 and processes such signals according to programmed instructions provided to the surface control unit 140. The surface control unit 140 displays desired drilling parameters and other information on a display/monitor 141 that is utilized by an operator to control the drilling operations. The surface control unit 140 may be a computer-based unit that may include a processor 142 (such as a microprocessor), a storage device 144, such as a solid-state memory, tape or hard disc, and one or more computer programs 146 in the storage device 144 that are accessible to the processor 142 for executing instructions contained in such programs. The surface control unit 140 may further communicate with a remote control unit 148. The surface control unit 140 may process data relating to the drilling operations, data from the sensors and devices on the surface, data received from downhole, and may control one or more operations of the downhole and surface devices. The data may be transmitted in analog or digital form.

The BHA 190 may also contain formation evaluation sensors or devices (also referred to as measurement-while-drilling ("MWD") or logging-while-drilling ("LWD") sensors) such as the acoustic sensors described above, as well as sensors for determining resistivity, density, porosity, permeability, other acoustic properties, nuclear-magnetic resonance properties, formation pressures, properties or characteristics of the fluids downhole and other desired properties of the formation 195 surrounding the BHA 190. Such sensors are generally known in the art and for convenience are generally denoted herein by numeral 165, and include counterparts to the sensor(s) 5 described above with respect to FIG. 1A. The BHA 190 may further include a variety of other sensors and devices 159 for determining one or more properties of the BHA 190 (such as vibration, bending moment, acceleration, oscillations, whirl, stick-slip, etc.), drilling operating parameters (such as weight-on-bit, fluid flow rate, pressure, temperature, rate of penetration, azimuth, tool face, drill bit rotation, etc.). For convenience, all such sensors are denoted by numeral 159.

The BHA 190 may include a steering apparatus or tool 158 for steering the drill bit 150 along a desired drilling path. In one aspect, the steering apparatus may include a steering unit 160, having a number of force application members 161a-161n. The force application members may be mounted directly on the drill string, or they may be at least partially integrated into the drilling motor. In another aspect, the force application members may be mounted on a sleeve, which is rotatable about the center axis of the drill string. The force application members may be activated using electro-mechanical, electro-hydraulic or mud-hydraulic actuators. In yet another embodiment the steering apparatus may include a steering unit 158 having a bent sub and a first steering device 158a to orient the bent sub in the wellbore and the second steering device 158b to maintain the bent sub along a selected drilling direction. The steering unit 158, 160 may include near-bit inclinometers and magnetometers.

The drilling system 101 may include sensors, circuitry and processing software and algorithms for providing information about desired drilling parameters relating to the BHA, drill string, the drill bit and downhole equipment such as a drilling motor, steering unit, thrusters, etc. Many current drilling systems, especially for drilling highly deviated and horizontal wellbores, utilize coiled-tubing for conveying the drilling assembly downhole. In such applications a thruster may be deployed in the drill string 190 to provide the required force on the drill bit.

Example sensors for determining drilling parameters include, but are not limited to drill bit sensors, an RPM sensor, a weight on bit sensor, sensors for measuring mud motor parameters (e.g., mud motor stator temperature, differential pressure across a mud motor, and fluid flow rate through a mud motor), and sensors for measuring acceleration, vibration, whirl, radial displacement, stick-slip, torque, shock, vibration, strain, stress, bending moment, bit bounce, axial thrust, friction, backward rotation, BHA buckling, and radial thrust. Sensors distributed along the drill string can measure physical quantities such as drill string acceleration and strain, internal pressures in the drill string bore, external pressure in the annulus, vibration, temperature, electrical and magnetic field intensities inside the drill string, bore of the drill string, etc. Suitable systems for making dynamic downhole measurements include COPILOT, a downhole measurement system, manufactured by BAKER HUGHES INCORPORATED.

The drilling system 101 can include one or more downhole processors at a suitable location such as 193 on the BHA 190. The processor(s) can be a microprocessor that uses a computer program implemented on a suitable non-transitory computer-readable medium that enables the processor to perform the control and processing. The non-transitory computer-readable medium may include one or more ROMs, EPROMs, EAROMs, EEPROMs, Flash Memories, RAMs, Hard Drives and/or Optical disks. Other equipment such as power and data buses, power supplies, and the like will be apparent to one skilled in the art.

In embodiments, the MWD system utilizes mud pulse telemetry to communicate data from a downhole location to the surface while drilling operations take place. Various mud-pulse telemetry systems may be implemented. U.S. Pat. No. 3,764,968 describes a rotating valve for the purpose to transmit frequency shift key (FSK) or phase shift key (PSK) coded signals. U.S. Pat. No. 6,898,150 to Hahn et al, commonly owned and incorporated by reference herein in its entirety, discloses a hydraulically balanced reciprocating pulser valve. U.S. Pat. No. 7,417,920 to Hahn et al, commonly owned and incorporated by reference herein in its entirety, discloses an improved reciprocating pulser valve. Different types of valve systems are used to generate downhole pressure pulses. Valves that open and close a bypass from the inside of the drill string to the wellbore annulus create negative pressure pulses, for example see U.S. Pat. No. 4,953,595. Valves that use a controlled restriction placed in the circulating mud stream are commonly referred to as positive pulse systems, for example, see U.S. Pat. No. 3,958,217. Another example of a negative pulsing valve is illustrated in U.S. Pat. No. 4,351,037. This technology includes a downhole valve for venting a portion of the circulating fluid from the interior of the drill string to the annular space between the pipe string and the borehole wall. Drilling fluids are circulated down the inside of the drill string, out through the drill bit and up the annular space to surface.

While a drill string 120 is shown as a conveyance device for sensors 165, it should be understood that embodiments of the present disclosure may be used in connection with tools conveyed via rigid (e.g. jointed tubular or coiled tubing) as well as non-rigid (e.g. wireline, slickline, e-line, etc.) conveyance systems. The drilling system 101 may include a bottomhole assembly and/or sensors and equipment for implementation of embodiments of the present disclosure on either a drill string or a wireline.

A point of novelty of the system illustrated in FIGS. 1A-1C is that the surface processor 142 and/or the downhole processor 193 are configured to perform certain methods (discussed below) that are not in the prior art. Surface processor 142 or downhole processor 193 may be configured to control mud pump 134, drawworks 130, rotary table 114, downhole motor 155, other components of the BHA 190, or other components of the drilling system 101. Surface processor 142 or downhole processor 193 may be configured to control sensors described above and to estimate a parameter of interest according to methods described herein.

Control of these components may be carried out using one or more models using methods described below. For example, surface processor 142 or downhole processor 193 may be configured to modify drilling operations i) autonomously upon triggering conditions, ii) in response to operator commands, or iii) combinations of these. Such modifications may include changing drilling parameters, mud parameters, and so on. Control of these devices, and of the various processes of the drilling system generally, may be carried out in a completely automated fashion or through interaction with personnel via notifications, graphical representations, user interfaces and the like. Additionally or alternatively, surface processor or downhole processor may be configured for the creation of the model. Reference information accessible to the processor may also be used.

In some general embodiments, surface processor 142, downhole processor 193, or other processors (e.g. remote processors) may be configured to use at least one sensor to produce a corresponding signal, responsive in part to a reflection of an emitted wave, from each of a plurality of azimuthally distributed orientations about a BHA. In some general embodiments, surface processor 142, downhole processor 193, or other processors (e.g. remote processors) may be configured to operate the tool 101 to excite and measure acoustic signals.

Mathematical models, look-up tables, or other models representing relationships between the signals and the values of the formation properties may be used to characterize operations in the formation or the formation itself, optimize one or more operational parameters of a production or development, and so on. The system may carry out these actions through notifications, advice, and/or intelligent control.

FIG. 1B is a schematic view of an acoustic logging while drilling tool system on a BHA drill collar 190 containing a drill bit 150. This system is mounted on the BHA drill collar 190 for performing acoustic measurements while the formation is being drilled. The acoustic logging while drilling tool system has a source 105 to emit acoustic vibrations 106 that may traverse formation 195 and may also be propagated along the borehole wall and be received by sensors A and B which may be in arrays. Collectively, transmitters, receivers, and associated circuitry comprises sensor(s) 107. Suitable filtering techniques, including phased arrays, may be employed to reduce the drillbit noise. In an alternate embodiment of the disclosure, the transmitter 105 may be located between the sensors and the drillbit 150.

In embodiments, electronics associated with sensors 107 may be configured to record and/or process the information obtained. Certain embodiments of the present disclosure may be implemented with a hardware environment 21 that includes an information processor 17, an information storage medium 13, an input device 11, processor memory 9, and may include peripheral information storage medium 19. The hardware environment may be in the well, at the rig, or at a remote location. Moreover, the several components of the hardware environment may be distributed among those locations. The input device 11 may be any data reader or user input device, such as data card reader, keyboard, USB port, etc. The information storage medium 13 stores information provided by the detectors. Information storage medium 13 may include any non-transitory computer-readable medium for standard computer information storage, such as a USB drive, memory stick, hard disk, removable RAM, EPROMs, EAROMs, flash memories and optical disks or other commonly used memory storage system known to one of ordinary skill in the art including Internet based storage. Information storage medium 13 stores a program that when executed causes information processor 17 to execute the disclosed method. Information storage medium 13 may also store the formation information provided by the user, or the formation information may be stored in a peripheral information storage medium 19, which may be any standard computer information storage device, such as a USB drive, memory stick, hard disk, removable RAM, or other commonly used memory storage system known to one of ordinary skill in the art including Internet based storage. Information processor 17 may be any form of computer or mathematical processing hardware, including Internet based hardware. When the program is loaded from information storage medium 13 into processor memory 9 (e.g. computer RAM), the program, when executed, causes information processor 17 to retrieve detector information from either information storage medium 13 or peripheral information storage medium 19 and process the information to estimate a parameter of interest. Information processor 17 may be located on the surface or downhole.

Systems as described above may be used to produce an image of an interface or other reflector within an earth formation. Producing an image may be referred to herein as "imaging" the reflector. Acoustic waves resulting from wave generation as described above may be used to image a reflector. Imaging the reflector may include determining the reflector's position and dip. The imaging procedure could be any method rearranging the acoustic information elements in a way that reflections and diffractions are plotted on their true locations in accordance with techniques familiar to those of ordinary skill in the art (e.g., an inversion operation as time or depth migration).

U.S. Pat. No. 7,035,165 to Tang having the same assignee as the present disclosure and the contents of which are incorporated herein by reference discloses a method in which a plurality of multicomponent acoustic measurements are obtained at a plurality of depths and for a plurality of source-receiver spacings on the logging tool. An orientation sensor on the logging tool, such as a magnetometer, may be used for obtaining an orientation measurement indicative of an orientation of the logging tool. The multicomponent measurements are rotated to a fixed coordinate system (such as an earth based system defined with respect to magnetic or geographic north) using the orientation measurement, giving rotated multicomponent measurements. The rotated multicomponent measurements are processed for providing an image of the subsurface. While the problem of Stoneley waves is not specifically discussed in Tang, examples shown by Tang and good signal-to-noise ratio for imaging of interfaces, e.g., bed boundaries. U.S. Patent Application publication no. US 2009/0205899 A1 to Geerits et al., having the same assignee as the present disclosure and the contents of which are incorporated herein by reference, discloses further improvements in MWD acoustic imaging.

U.S. Pat. No. 8,055,448 B2 to Mathiszik et al., having the same assignee as the present disclosure and the contents of which are incorporated herein by reference, discloses further improvements in MWD acoustic imaging. A downhole acoustic logging tool is used for generating a guided borehole wave that propagates into the formation as a body wave, reflects from an interface and is converted back into a guided borehole wave. Guided borehole waves resulting from reflection of the body wave are used to image a reflector.

Compression

Aspects of the present disclosure may include automatically generating a compressed representation of an acoustic reflection image. In general method embodiments, the representation may be generated by identifying a set of features in the acoustic reflection image substantially fitting a pattern, wherein the set of features corresponds to a portion of at least one reflecting structural interface of the formation; and using a representation of the pattern as the compressed representation of the acoustic reflection image.

The acoustic reflection image may be a result of acoustic pre-processing (e.g., noise reduction, filtering, removal or attenuation of direct waves and multiples) and, above all, acoustic migration. Acoustic migration (sometimes referred to as seismic migration), as used herein, refers to a geometric re-location of acoustic events, represented by coherent signals along curves within the image. These curves are representative of structural interfaces, although the existence of footprints of removed direct waves and other artifacts generated in pre-processing may also be present. Such events are treated as noise.

A useful property of the acoustic reflection images discussed herein is that meaningful events predominantly show one dominant direction, or a few dominant directions clustered in common orientations. Along each of these directions, signals may have low-frequency content and most often lie over straight lines. Images may correspond to, and be expressed as matrices, I(m,n), with m=1, 2 . . . M and n=1, 2 . . . N, representing intensity value at the image point (or pixel) at column m and line n.

The features may be amplitude peaks in the acoustic reflection image, and the pattern may be a line segment therein that is obtained from the amplitude peaks. Identifying the set of features may include generating a binary image of the peaks. Identifying the set of features in the acoustic reflection image substantially fitting the pattern may be carried out by determining an envelope of the acoustic reflection image in a determined strike direction and finding dominant peaks in the envelope. The acoustic reflection image may be obtained from an original acoustic reflection image via the application of a 2-D spatial wavenumber filter. This filter may be automatically generated as a polar segment within the 2-D spatial wavenumber amplitude spectrum of at least a portion of the original acoustic reflection image, wherein an azimuthal orientation of the polar segment defines the determined strike.

Aspects of the present disclosure relate to for smart filtering, pattern recognition, automatic interpretation and compression of acoustic reflection images produced in real time by a drill string based acoustic tool. Techniques described herein, in accordance with general embodiments, may be carried out in several component sub-processes.

Figure 2:
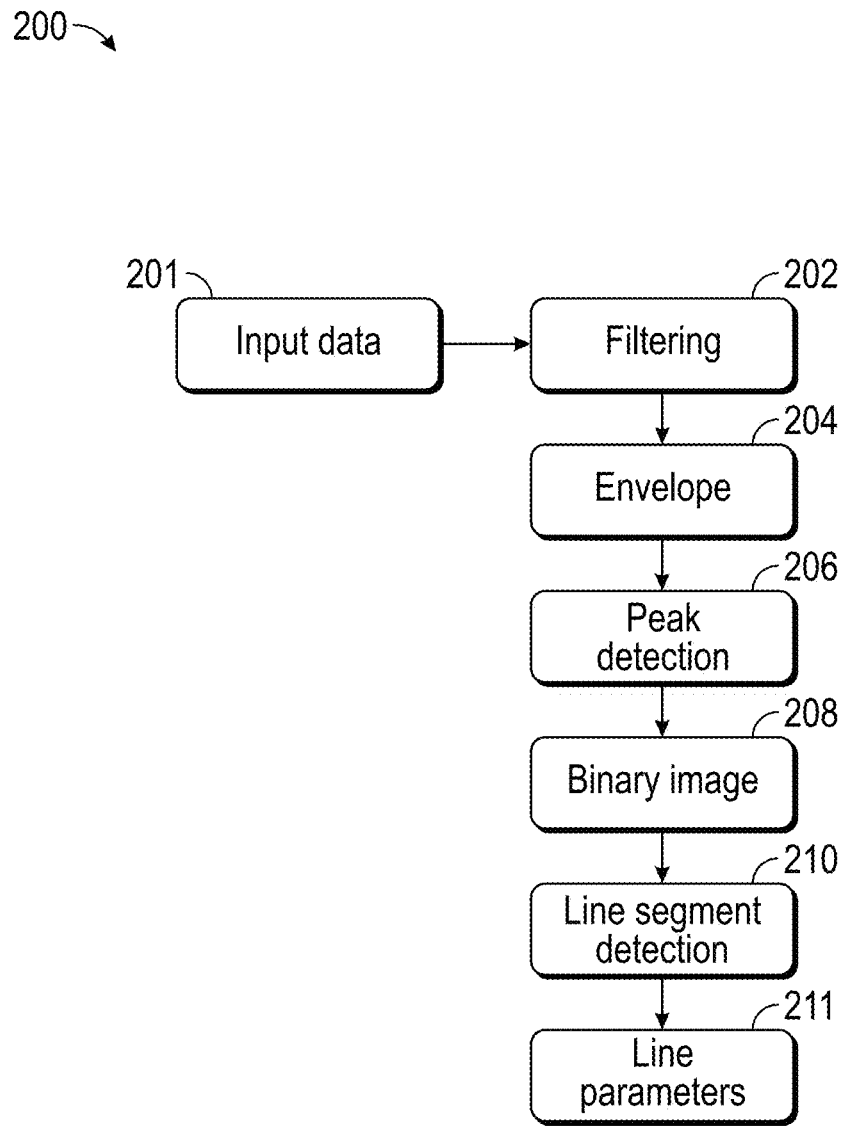
FIG. 2 shows a process workflow illustrating processing techniques in accordance with the present disclosure.

FIG. 2 shows a process workflow illustrating processing techniques in accordance with the present disclosure. First, the acoustic reflection image, in the form of input data 201 may be filtered at step 202. Spatial Fourier transformation and band pass filtering of the image data may be followed by automatic picking of the dominant strike (i.e., direction perpendicular to dip). The resulting data from step 202 may be used for computation of a processed image envelope at step 204, such as, for example, by using a 2-D Hilbert transform in the strike direction to enhance main reflection amplitude and reduce reflector redundancy. At step 206, peak detection may be performed on the resulting data, such as, for example, by automatic picking of peaks from the envelope image.

At step 208, a binary image may be generated. Generation of the binary image is discussed in greater detail below with respect to FIGS. 7A-7G. Step 210 may include line segment detection that may be carried out by automatic determination of line segment parameters using a transformation. The pattern may be encoded by at least one of: i) a Hough transformation; and ii) a modification of the Hough transformation. At step 211, the parameters of the line segment(s) may be used as a compressed representation of the image. Thus, the line segment parameters may be transmitted uphole, e.g., to the surface, for use in further operations in the formation, e.g., controlling an operation of the drilling system.

Figure 3A:
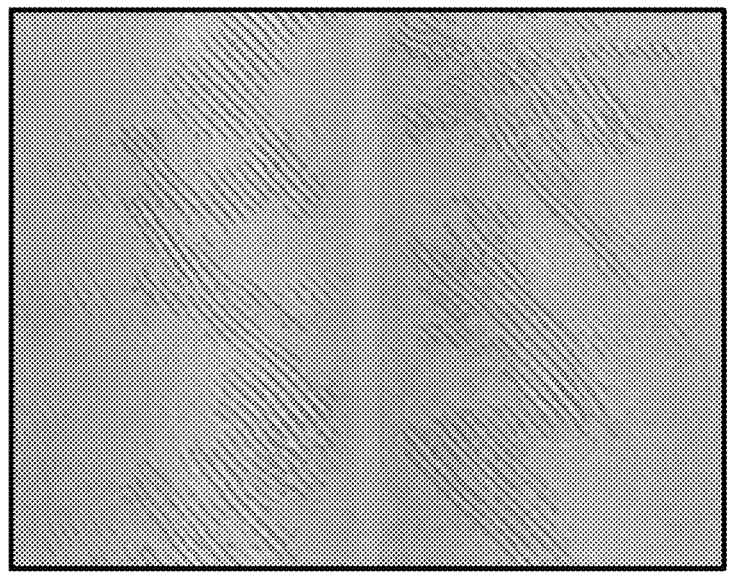
FIGS. 3A & 3B illustrate techniques in accordance with embodiments of the present disclosure.
Figure 3B:
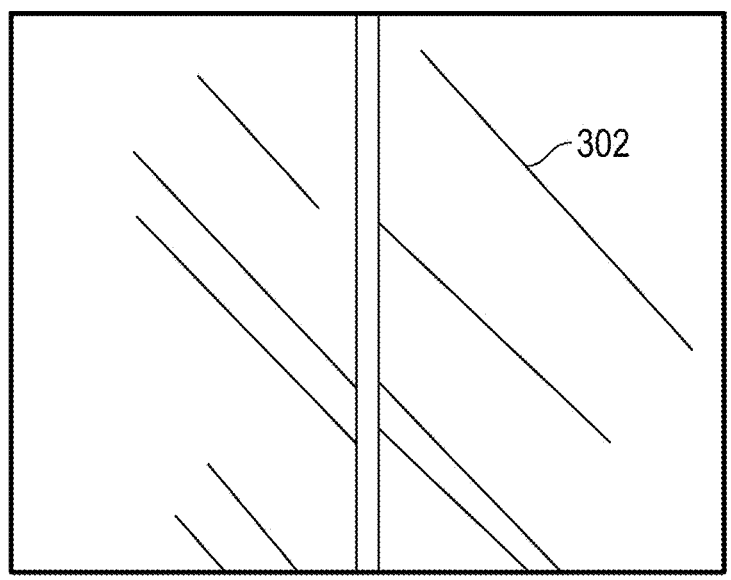

FIGS. 1A-1C show schematic diagrams illustrating an example drilling system in accordance with embodiments of the disclosure. FIG. 2 shows a process workflow illustrating processing techniques in accordance with the present disclosure. FIGS. 3A & 3B illustrate techniques in accordance with embodiments of the present disclosure. FIG. 3A shows an acoustic reflection image 300. FIG. 3B shows a binary image 301 including features from which a pattern may be evident in the form of line segment 302.

The methodology of the present disclosure has shown a capability to automatically enhance image quality, detect preferential structural dips, separate relevant parts of reflection image data, and reduce image data 100 to 800 times (depending on data quality). The automation of the processing workflow and enormous reduction in data size significantly reduces time taken by mud pulse telemetry to send meaningful reflection image data from a LWD tool located downhole to the surface. Using the techniques described herein, components of reflection image data that would take tens of hours to be sent to the surface using conventional compression means may have completely transmitted in a range of 5-30 minutes or less. This increase in transmission rate with sufficient fidelity for operations makes feasible the real-time use of reflection image data for controlling drilling and other wellbore operations, including real-time formation structural analysis and geonavigation (e.g., geosteering). Aspects of the present disclosure may be similarly beneficially applied to acoustic reflection image post-survey processing for both LWD and wireline acoustic data.

As described above, a useful property of the acoustic reflection images discussed herein is that meaningful events predominantly show one dominant direction, or a few dominant directions clustered in common orientations. Filter construction in accordance with embodiments of the present disclosure may therefore be based on the property that the amplitude peaks over a straight line.

In an image domain $I(m,n)$, a line can be expressed as $n = \alpha m + \beta$. In a Fourier-domain $\tilde{I}(k,l)$, that line is transformed to another line, expressed by $\alpha l + k = 0$, being perpendicular to its corresponding original line in the image domain. This important property can be shown in a simplified, qualitative way if we consider continuous (not discrete) variables $(m,n)$ and $(k,l)$ in image and Fourier domains, respectively and, moreover, with unit amplitude. In this case, the function $I(m,n)$ can be expressed as $$I[m,n] = \delta[n-(\alpha m+\beta)], \quad (1)$$

where $\delta(.)$ denotes the 1D delta function. The 2D Fourier transform of Equation (1) is given by $$\tilde{I}[k,l] = \int_{-\infty}^{+\infty}\int_{-\infty}^{+\infty} dm\, dn\, \delta[n-(\alpha m+\beta)] e^{-i2\pi(mk+nl)} \quad (2)$$

$$= \int_{-\infty}^{+\infty} dm\, e^{-i2\pi mk} \left\{ \int_{-\infty}^{+\infty} dn\, \delta[y-(\alpha m+\beta)] e^{-i2\pi nl} \right\}$$

$$= \int_{-\infty}^{+\infty} dm\, e^{-i2\pi mk} \left[ e^{-i2\pi l(\alpha m+\beta)} \right]$$

$$= e^{-i2\pi l\beta} \int_{-\infty}^{+\infty} dm\, e^{-i2\pi m(\alpha l+k)} = e^{-i2\pi l\beta}\delta(\alpha l+k),$$

where we have used the properties of the Fourier Transform of the Dirac function:

$$\int_{-\infty}^{+\infty} f(m)\delta(m-\lambda)dm = f(\lambda), \text{ and } \delta(m-\lambda) = \int_{-\infty}^{+\infty} e^{-i2\pi(m-\gamma)}dm. \quad (3)$$

Figure 4A:
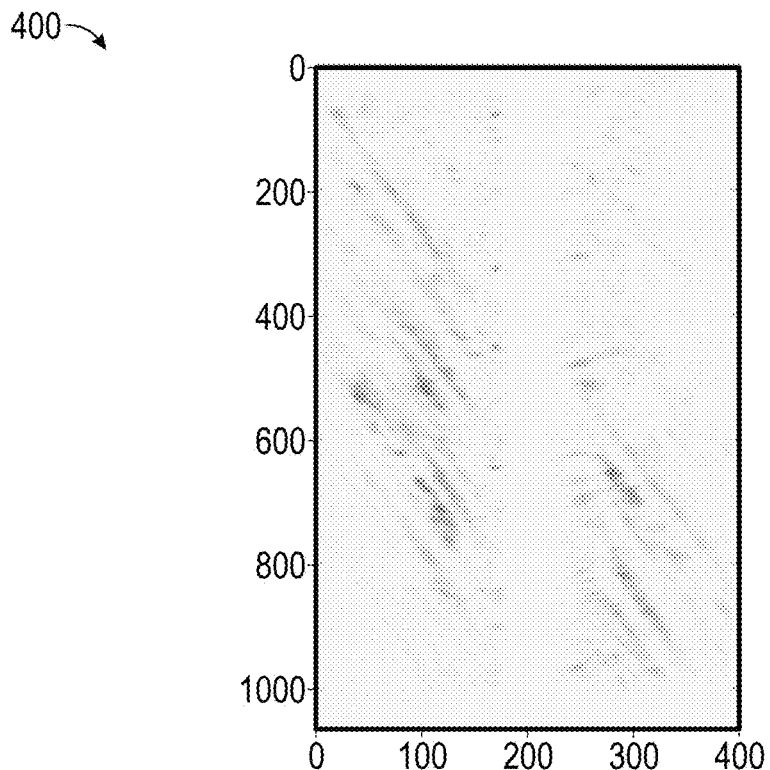
FIGS. 4A & 4B illustrate the Fourier domain in accordance with embodiments of the present disclosure.
Figure 4B:
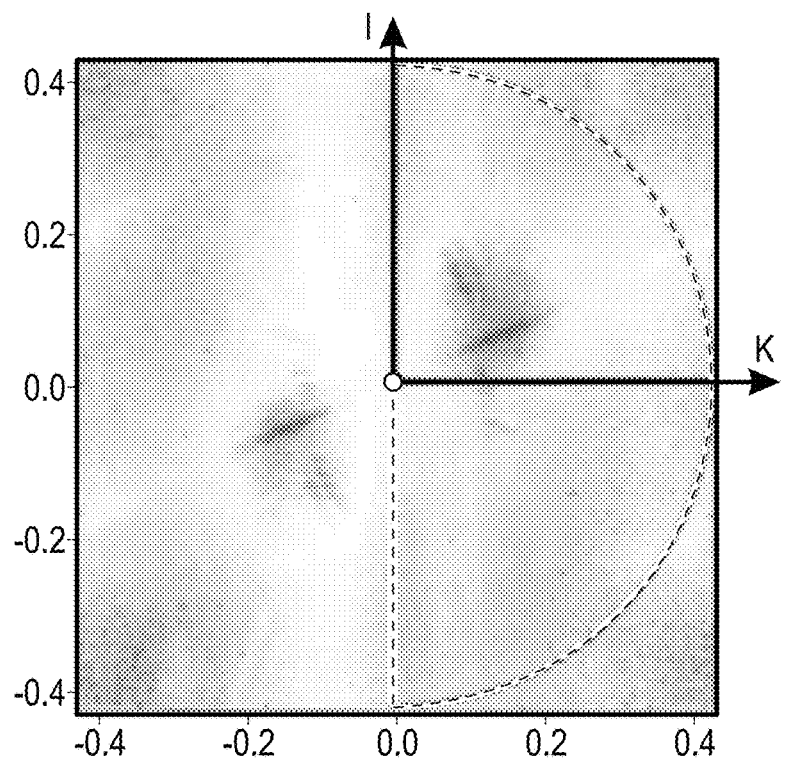

FIGS. 4A & 4B illustrate the Fourier domain in accordance with embodiments of the present disclosure. FIG. 4A shows an acoustic reflection image 400. FIG. 4B shows the same reflection image 400 represented as an image 401 in the Fourier domain. Fourier filtering may serve to identify structural interfaces and suppress, or at least attenuate, the noise present on LWD images. In the Fourier domain, the meaningful events and noise can be more easily distinguished by their respective directions, which is a result of the dominant orientation of LWD images.

Equation (2) shows that the Fourier transform of a straight line event (i.e an event with amplitude peaks over a line) is another straight line which passes through the origin and has an orientation perpendicular to the original line.

As a consequence of the linearity of the Fourier transform, it follows that, if a function in the image domain is a superposition of several line events, its Fourier transform will also be a superposition of line events. It can be also inferred from the above analysis that, if all line events in image domain are aligned (i.e., exhibit the same orientation), they all contribute to the same line event in the Fourier domain. This provides an insight on how to identify dominant directions within an image. That is, if that image presents dominant directions, these will lead to regions with large values in the Fourier domain.

The Fourier transform pair for the image $I[m,n]$ and its transform $\tilde{I}[k,l]$ may be expressed in discrete form:

$$\tilde{I}[k,l] = \frac{1}{\sqrt{MN}} \sum_{m=1}^{M} \sum_{n=1}^{N} I[m,n] e^{-i2\pi\left(\frac{mk}{M}+\frac{nl}{N}\right)} \quad (4a)$$

and $$I[m,n] = \frac{1}{\sqrt{MN}} \sum_{k=1}^{M} \sum_{l=1}^{N} \tilde{I}[k,l] e^{i2\pi\left(\frac{mk}{M}+\frac{nl}{N}\right)}. \quad (4b)$$

In the following, we regard pairs $(m,n)$ and $(k,l)$ indistinctly as points or vectors (from the origin) in the image and frequency domains, respectively. The inverse Fourier transform of Equation (4b) implies that the image, $I[m,n]$, is represented by a superposition of complex exponentials $$\tilde{I}[k,l]e^{i2\pi\left(\frac{mk}{M}+\frac{nl}{N}\right)} = \tilde{I}[k,l]\left[\cos\left(\frac{mk}{M}+\frac{nl}{N}\right)+i\sin\left(\frac{mk}{M}+\frac{nl}{N}\right)\right], \quad (5)$$

with complex amplitudes, $\tilde{I}[k,l]$. The frequencies $k$ and $l$ can be parameterized by polar coordinates $$k = r_{kl}\cos\theta_{kl} \text{ and } l = r_{kl}\sin\theta_{kl}, \quad (6)$$

where $r_{kl} = \sqrt{k^2+l^2}$ and $\theta_{kl} = \arctan(l/k)$ are the frequency magnitude and frequency angle direction, respectively. In this way, the complex exponential of Equation (5) can be recast as $$\tilde{I}[k,l]\exp\left[i2\pi\left(\frac{mk}{M}+\frac{nl}{N}\right)\right] = \tilde{I}[k,l]\exp[i2\pi r_{kl}(\vec{x}_{mn}\cdot\hat{u}_{kl})], \quad (7)$$

where $\hat{u}_{kl} = (\cos\theta_{kl}, \sin\theta_{kl})$ is a unitary vector along direction $(k,l)$ and $\vec{x}_{mn} = (m/M, n/N)$ is a vector associated with the point (or vector) $(m,n)$ in image domain. The inner product $\vec{x}\cdot\hat{n}$ is a projection of the image vector, $\vec{x}$, onto the direction, $\hat{u}$. It is apparent that all points lying on a same line perpendicular to $\hat{u}$ have the same projection on $\hat{u}$ direction. When this happens, the argument within the exponential in Equation (7) will always have a same value (recall the analysis of the continuous case). We can, thus expect that if the image, I[m,n], contains aligned events (i.e., events with the same orientation) in a direction, û, the corresponding complex coefficients, Ĩ[k,l], along the direction, û⊥, perpendicular to û, will have a significant contribution to the image. Filter construction may be implemented to preserve the spatial frequency pairs, (k,l), for which we have a large amplitude, |Ĩ[k,l]|, and to discard the frequencies for which the amplitudes are small.

In one example, a filter may be employed comprising multiplication of the Fourier transform of the image I[k,l] by an automatically detected mask H[k,l], followed by application of inverse Fourier to return to the image domain. More specifically, the filtered image function may be given by the real part of $$F[m, n] = \frac{1}{\sqrt{MN}} \sum_{l=1}^{N} \sum_{m=1}^{M} \tilde{I}[k, l]H[k, l]e^{i2\pi\left(\frac{mk}{M} + \frac{nl}{N}\right)}. \quad (8)$$

For a parameter choice of amplitude, a, and angle directions, $\theta_1 < \theta_2$, as defined by Equation (6), mask H[k,l] will be given by $$O[k, l] = \begin{cases} 1, & \text{if } r < a, \quad \theta_1 < \theta < \theta_2, \\ 0, & \text{otherwise} \end{cases} \quad (9a)$$

$$H[k, l] = \frac{1}{(2w+1)^2} \sum_{i=-w}^{w} \sum_{j=-w}^{w} O[k+i, l+j], \quad (9b)$$

The mean filtering (Equation 9b) may be used simply to replace each value of the ideal mask (Equation 9a) with the mean value of its neighbors (i.e., a kernel of size w x w). This approach works as a taper, smoothing the edges of the mask, which is efficient to remove artifacts (e.g., Gibbs phenomena) characteristic to Fourier domain filtering.

Geometrically, the mask defined by Equation (9a) represents a circular sector, enclosed by two radii of directions $\theta_1$ and $\theta_2$ and an arc of circle with radius α (see FIG. 12). The aperture $(\theta_1, \theta_2)$ encloses the dominant direction, θ, and the radius α limits the low-frequency content of the Fourier transform of the image.

In view of Equations (8) and (9a), estimating the direction aperture, $(\theta_1, \theta_2)$ and radius α, upon which the filter O[k,l] is defined may be conducted using an automatic procedure applied directly to the data. As shown below, this goal can be achieved by an automatic procedure applied directly to the data. One starting point is to have the spatial frequency pairs (k,l) expressed by Equation (6). For each θ in the interval $(-\pi/2, \pi/2)$, we consider the sum $$R(\theta) = \sum_{k,l} |\tilde{I}[r_{kl} \cos \theta_{kl}, r_{kl} \sin \theta_{kl}]| \quad (10)$$

in which $r_{kl} < \alpha$ and the direction lies in the range $\theta_1 < \theta < \theta_2$ (see FIG. 13). Under the assumption of a unit grid spacing in the horizontal and vertical directions, the maximum value, $r_{max}(\theta)$, that can be achieved by a satisfies the conditions $r_{max}(\theta)\cos \theta = M$ and $r_{max}(\theta)\sin \theta = N$. As a consequence, it is apparent that $$r_{max}(\theta) = \frac{MN}{2\sqrt{(N \cos \theta)^2 + (M \sin \theta)^2}}, \quad (11)$$

where M and N are the dimensions of the image (and also Fourier) domains.

Considering the previous insight, if the image contains a dominant direction, $\tilde{\theta}$, this will lead to large amplitudes in its Fourier spectrum along a line that passes through the origin and is perpendicular to that original direction. As a consequence, along that perpendicular direction, the sum R($\tilde{\theta}$) in Equation (10) is bound to attain a large value. The dominant direction, $\tilde{\theta}$, will thus be the value of θ for which R has its largest value. Observe that, since the desired structures are not exactly parallel to each other (and also because of discretization issues), the large spectrum amplitudes will be associated to a region near the direction $\tilde{\theta}$. Moreover, structures not exactly parallel may lead the presence of two or more large spectrum amplitudes, which characterize an image with more than one dominant orientation. Therefore a direction aperture $(\theta_1, \theta_2)$ is necessary in order to ensure that the significant frequencies will not be discarded. Here we have found good results for selecting $\theta_1$ and $\theta_2$ based on the root-mean-square (RMS) value of $$R_{RMS} = \left[\frac{1}{\pi}\sum_{-\pi/2}^{\pi/2} |R(\phi)|^2 d\phi\right]^{1/2}, \quad (12a)$$

and also based on a windowed RMS (wRMS) filtered version of the R(θ)

$$R_{wRMS}(\theta) = \left[\frac{1}{(2w+1)}\sum_{j=-w}^{w} (R(\theta+j))^2\right]^{1/2}. \quad (12b)$$

$\theta_1$ is selected as the closest angle less than or equal to $\tilde{\theta}$ for which $R_{wRMS}(\theta_1)$ best approximates $R_{RMS}$. An analogous selection holds for $\theta_2$, employing angles greater than $\tilde{\theta}$. Finally, the radius of the circular-sector mask with a suitable choice of the frequency magnitude α is selected, with the help of the RMS quantity $\tilde{I}_{RMS}$ given by $$\tilde{I}_{RMS} = \frac{1}{r_{max}(\tilde{\theta})}\left[\int_0^{r_{max}(\tilde{\theta})} |\tilde{I}[\alpha \cos \tilde{\theta}, \alpha \sin \tilde{\theta}]|^2 d\alpha\right]^{1/2}. \quad (13)$$

A good choice for α is the one for which $|\tilde{I}(\alpha \cos \tilde{\theta}, \alpha \sin \tilde{\theta})|$ is closest to $\tilde{I}_{RMS}$. In this way, techniques of the present disclosure have a method to automatically detect the mask needed to filter the image I[m,n] in the Fourier domain.

Figure 5A:
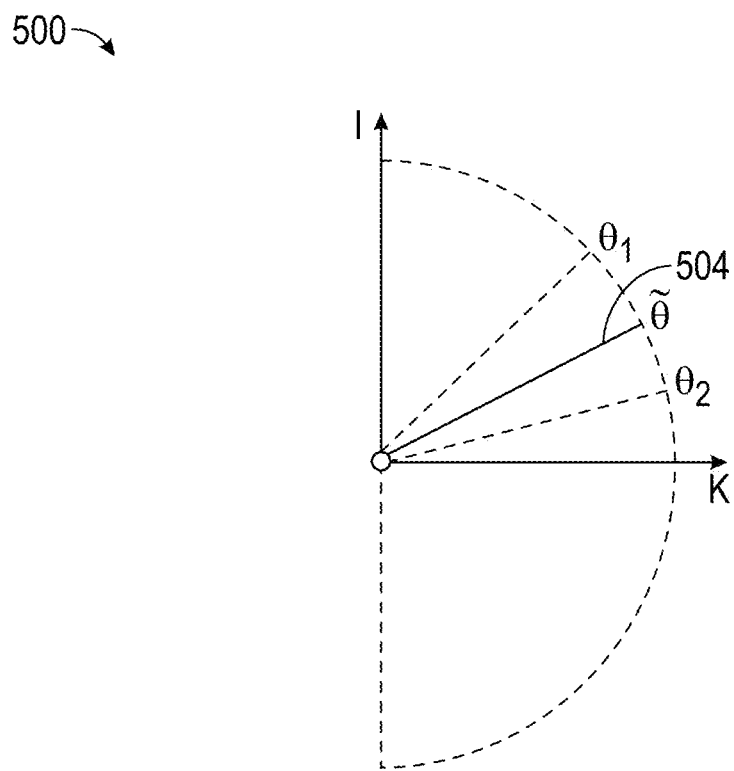
FIGS. 5A-5D illustrate filtering in the Fourier domain in accordance with embodiments of the present disclosure.
Figure 5B:
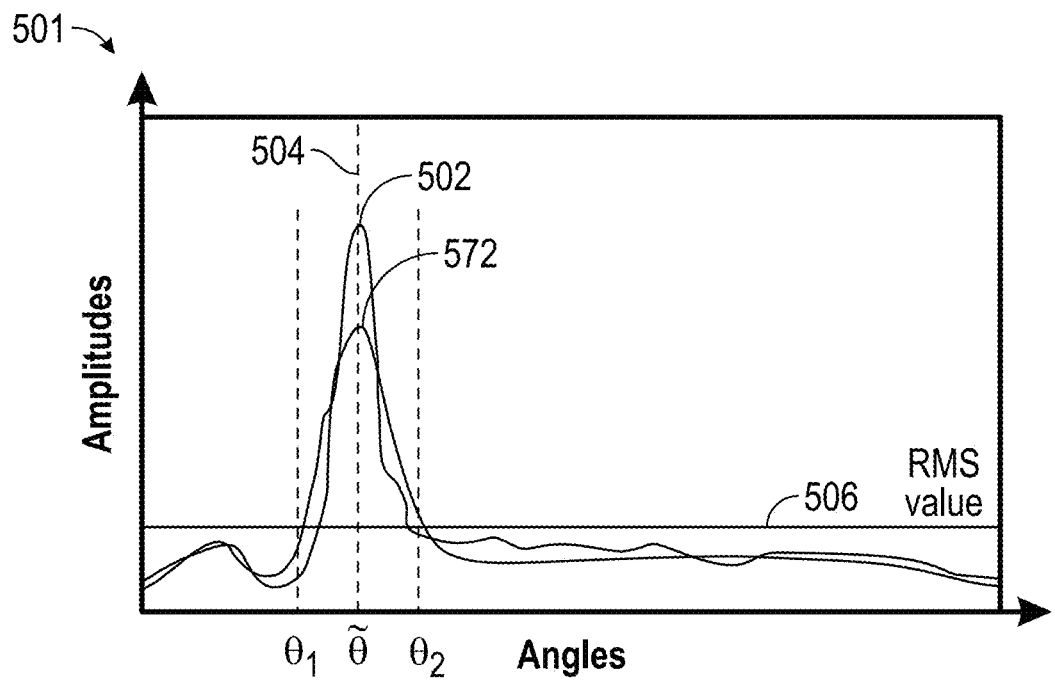

FIGS. 5A-5D illustrate filtering in the Fourier domain in accordance with embodiments of the present disclosure. FIG. 5A shows an acoustic reflection image 500 in the Fourier domain. FIG. 5B is a histogram 501 comprising a curve 502 illustrating amplitude values with respect to azimuth for the amplitudes collected in the Fourier domain image. Curve 512 illustrates amplitude values with respect to azimuth, with a windowed RMS function applied to the amplitudes. The dominant direction 504 is detected as described above and the aperture angles $\theta_1$ and $\theta_2$ are selected using an RMS value 506. Referring back to FIG.

5A, dominant direction 504 and the aperture angles $\theta_1$ and $\theta_2$ in the Fourier domain are shown.

Figure 5C:
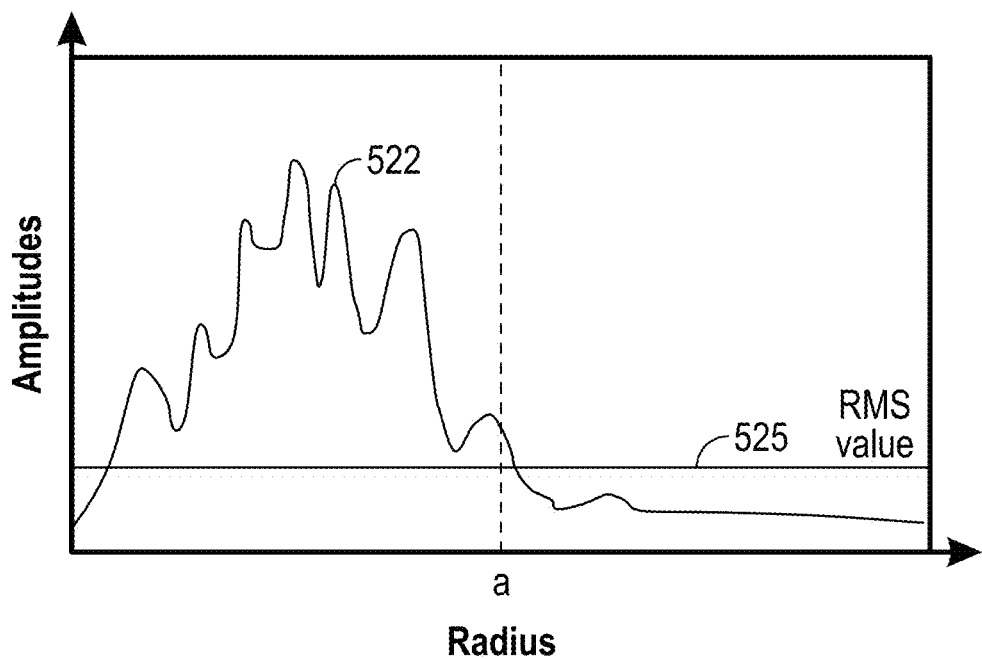
Figure 5D:
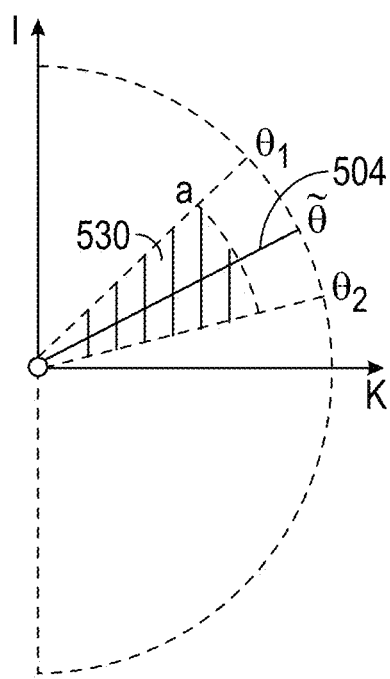

FIGS. 5C & 5D illustrate estimation of maximum radius to complete a mask definition in accordance with embodiments of the present disclosure. FIG. 5C is a histogram 511 comprising a curve 522 illustrating amplitude values with respect to radius along the dominant direction 504. A maximum radius α may be selected using an RMS value 524 of the amplitudes along the dominant direction. Referring to FIG. 5D, the mask 530 in the Fourier domain is defined with radius α and angles $\theta_1$ and $\theta_2$.

Figure 6A:
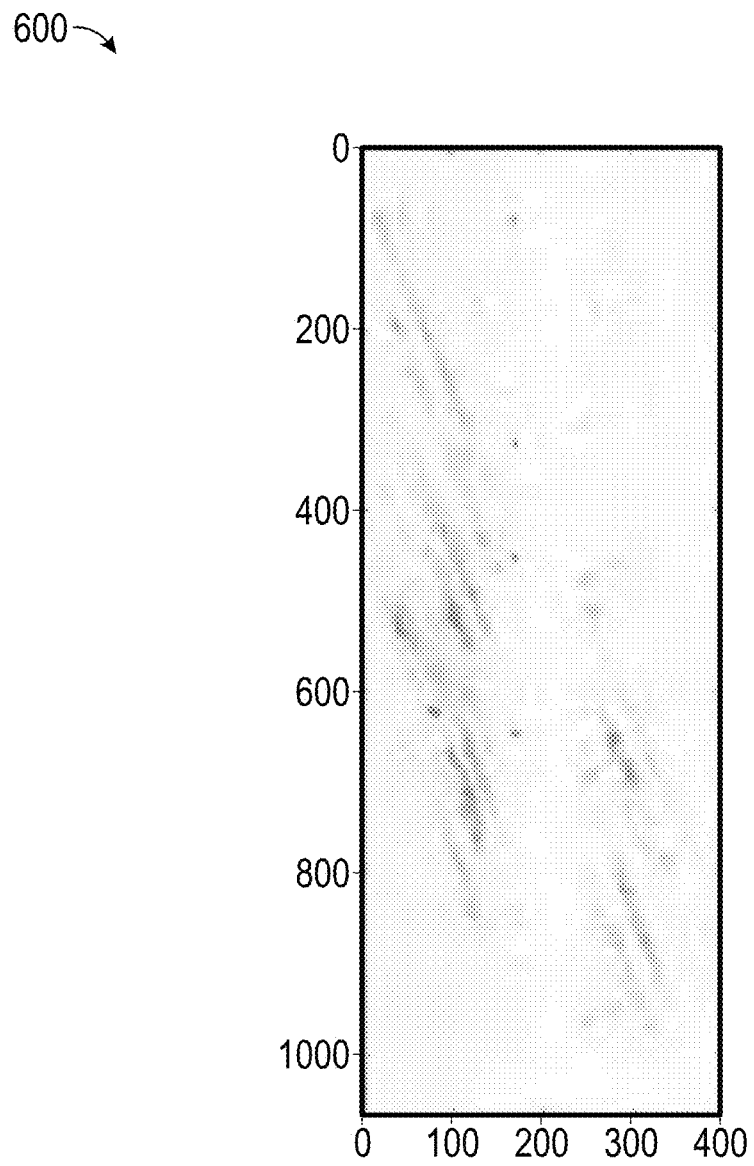
FIGS. 6A-6E illustrate filtering results in accordance with embodiments of the present disclosure.
Figure 6B:
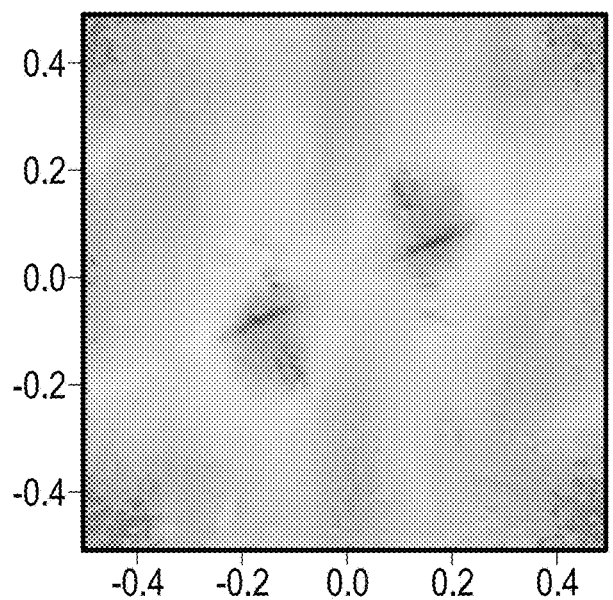
Figure 6C:
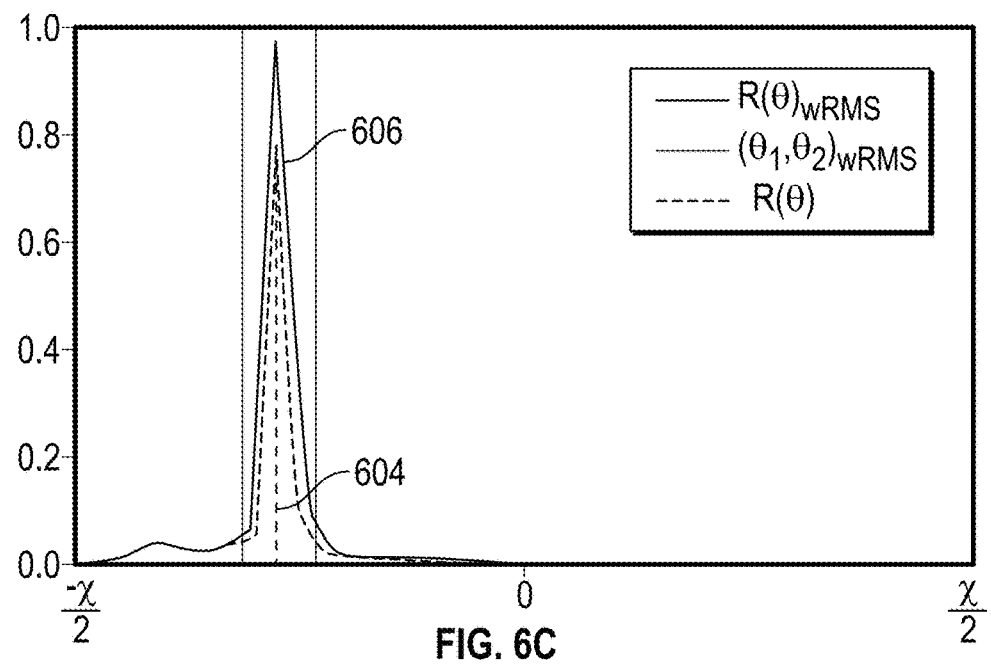
Figure 6D:
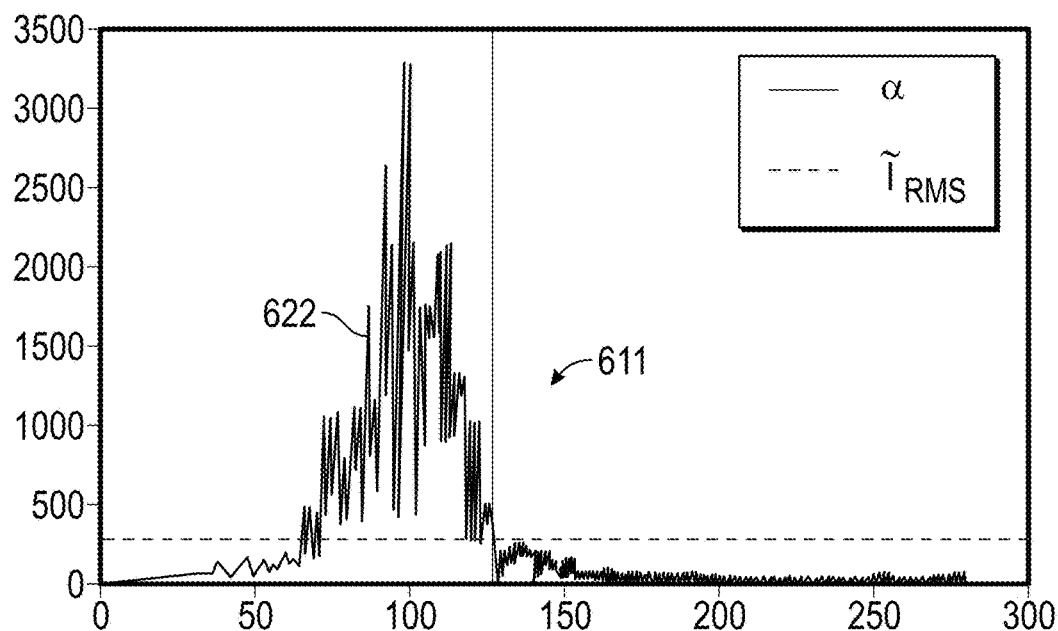
Figure 6E:
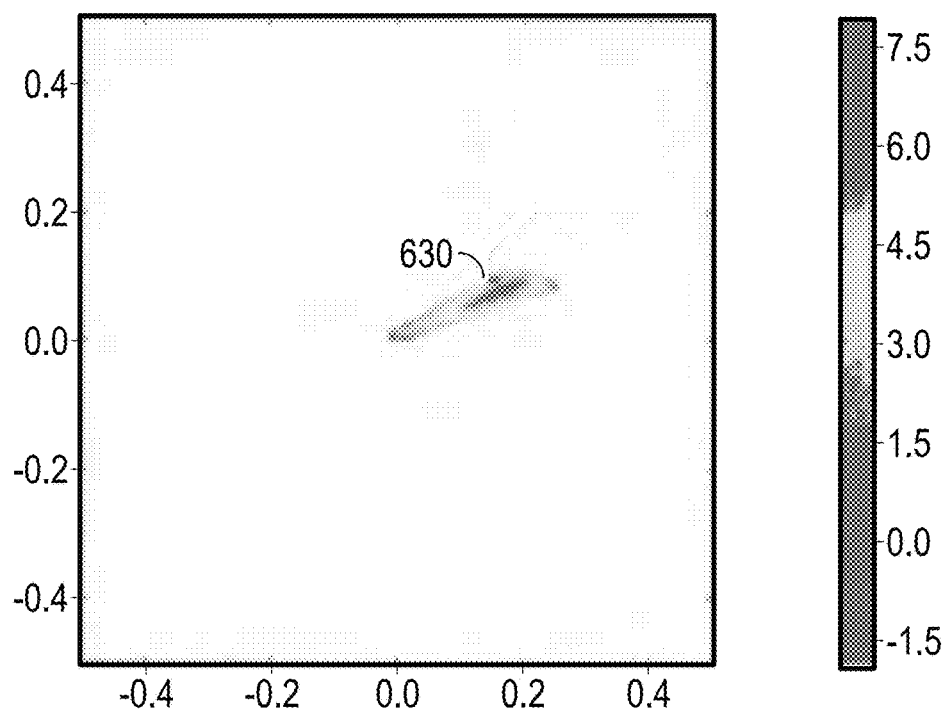

FIGS. 6A-6E illustrate filtering results in accordance with embodiments of the present disclosure. FIG. 6A shows an acoustic reflection image 600. FIG. 6B shows an acoustic reflection image 601 in the Fourier domain. FIG. 6B is a histogram 602 comprising a curve 606 illustrating amplitude values with respect to azimuth for the amplitudes collected in the Fourier domain image. Dominant direction 604 is determined. FIG. 6D is a histogram 611 comprising a curve 622 illustrating amplitude values with respect to radius along the dominant direction 604. FIG. 6E shows the resulting mask 630 in the Fourier domain.

After construction of the filter mask, as described above, follows envelope construction. The envelope is a well-known acoustic interpretation technique useful to highlight lithological discontinuities. Aspects of the present disclosure include an extension of the envelope technique, described hereinafter.

A further identification of meaningful events can be achieved if the so-called envelope is applied to the filtered image of Equation (8). The envelope may be represented as a continuous, real signal of a continuous real variable, u(x).

$$u(x)=\int_{-\infty}^{\infty}\tilde{u}(k)e^{i2\pi kx}d=Re\{\int_{-\infty}^{\infty}\tilde{u}(k)[1+\text{sgn}(k)]e^{i2\pi kx}dk\}, \quad (14)$$

in which $\tilde{u}(k)$ is the Fourier transform of u(x), $$\tilde{u}(k)=\int_{-\infty}^{\infty}u(x)e^{-i2\pi kx}dx, \quad (15)$$

and the signal function sgn(k) is defined as $$\text{sgn}(k) = \begin{cases} 1, & \text{if } k > 0, \\ 0, & \text{if } k = 0, \\ -1, & \text{if } k < 0 \end{cases} \quad (16)$$

We note that, with the above definition, the representation of u(x) can be recast in the form $$u(x)=Re\{2\int_0^{\infty}\tilde{u}(k)e^{i2\pi kx}dk\}, \quad (17)$$

which shows that the real signal, u(x), can be expressed as a superposition of Fourier components of real frequencies only. We now introduce the analytic (complex) signal, U(x), defined by $$U(x)=\int_{-\infty}^{\infty}\tilde{u}(k)[1+\text{sgn}(k)]e^{i2\pi kx}dk=u(x)+iv(x), \quad (18)$$

in which, u(x)=Re{U(x)} (see Equation (14)) and v(x)=Im{U(x)}. In the literature, v(x) is referred to as the Hilbert transform of u(x) and denoted by v(x)=H[v(x)]. Finally, the envelope (or reflection strength) of the signal u(x) is defined as $$E[u(x)]=|U(x)|=\sqrt{[u(x)]^2+[v(x)]^2}. \quad (19)$$

A discussion on the properties of the envelope, in particular its ability to highlight lithological discontinuities can be found in, e.g., Taner et al. (1979) and Subrahmanyam and Rao (2008).

The introduction above is focused on the envelope of a one-dimensional function. However, it may be generally desirable to extend the envelope to two-dimensional signals, which may be accomplished using the approach proposed in Granlund (1995), which considers the envelope as a one-dimensional operation along a predefined direction. More specifically, for a two-dimensional, real signal u(x,y) and a given direction vector, e=(cos θ, sin θ) the corresponding analytical signal may be defined as $$U(x,y)=\int_{-\infty}^{\infty}\int_{-\infty}^{\infty}\tilde{u}(k,l)[1+\text{sgn}(\vec{k}\cdot\hat{e})]e^{i2\pi\vec{k}\cdot\vec{x}}dkdl. \quad (20)$$

The comparison with Equation (18) should be noted. Here, we have used the notations $\vec{k}=(k,l)$ and $\vec{x}=(x,y)$, so that $$\vec{k}\cdot\hat{e}=k\cos\theta+l\sin\theta \text{ and } \vec{k}\cdot\vec{x}=kx+ly. \quad (21)$$

The definition (20) has a dependence on a predefined orientation, which in the present disclosure may be configured as a dominant direction of the LWD image. That is, the previously identified dominant direction may be used as the predefined orientation for the envelope. In this way, the analytic signal, $F_{an}(m,n)$, corresponding to F(m,n) is given by $$F[m,n] = \frac{1}{\sqrt{MN}}\sum_{l=1}^{N}\sum_{m=1}^{M}\tilde{I}[k,l]H[k,l]\left[1+\text{sgn}(\vec{k}\cdot\hat{e})\right]e^{i2\pi\left(\frac{mk}{M}+\frac{nl}{N}\right)} \quad (22)$$

The image envelope can now be calculated by the absolute value of $F_{an}(m,n)$, namely, $$E(m,n)=\sqrt{[Re\{F_{an}(m,n)\}]^2+[Im\{F_{an}(m,n)\}]^2}. \quad (23)$$

It should be emphasized that this approach to calculate the envelope saves, not only computation effort by not computing the analytical signal in the image domain, but also reduces the process to calculating the absolute value of the filtered image only.

As described above, a set of features in the acoustic reflection image may be identified. In general embodiments, these features may include amplitude peaks. The locations of the peaks within the image are extracted from the enveloped images, which reduces full-size information of the image.

In one estimation, the envelope represents the instantaneous energy of a recorded signal. Considering that meaningful events may lie on peaks (points of high energy) of the enveloped image, in regions of high variations of energy, it is observed that, in the enveloped image, a maximum (high-energy peak) generally lies between two minima (points of low energy). However, not all maxima correspond to meaningful (coherent) events–some maxima are related to attenuated noise.

Non-meaningful events have, in general, smaller amplitude than their meaningful (coherent) counterparts. This fact suggests, as one strategy, the use of a global threshold to discard the maxima that correspond to noise. However, a global threshold may fail in the case of meaningful maxima of low amplitude. Moreover, the global threshold is not able to deal with events that are associated with more than one maximum.

The above difficulties recommend the use of a more elaborated approach based on local thresholds. In the following, a local-threshold strategy is employed. Without much formalization, it is intuitively clear that, for a given signal, s(x), local maxima and minima positions are alternated, i.e., there cannot exist two consecutive maxima (minima) without a minimum (maximum) between them.

Based on that simple observation, we propose a scheme to separate local maxima and minima for a signal s(x). As used herein:

A local maximum $s(x_j)$ is defined when the signal is non-decreasing at its left, i.e., $x_i < x_j \Rightarrow s(x_i) \leq s(x_j)$, and non-increasing at its right, i.e., $x_j < x_k \Rightarrow s(x_j) \geq s(x_k)$;

A local minimum $s(x_j)$ is defined when the signal is non-increasing at its left and non-decreasing at its right.

Based on the above definitions, significant maxima will be called peaks and their location denoted by $p_i$, with i counting the number of maxima. Analogously, significant minima will be called troughs and their location are denoted by $t_j$, with j counting the number of minima. We recall that each maximum, located at $p_i$, lies between two adjacent minima, with location specified by $t_{i-1}$ and $t_{i+1}$, respectively. The difference between the maximum value, $s(p_i)$, and the values of the its adjacent minima $s(t_{i-1})$ and $s(t_{i+1})$ will be denoted by $$s(p_i) - s(t_{i-1}) = \delta_{i-},$$

$$s(p_i) - s(t_{i+1}) = \delta_{i+}. \quad (24)$$

The above (all positive) values, $\delta_{i-}$ and $\delta_{i+}$ are now collected in a set $\Delta = \{\delta_{i-}, \delta_{i+}, i=1, \ldots, N\}$ running on the number N of points of maximum, $p_i$. Techniques herein include finding an element (threshold), $\delta^*$, in the set, $\Delta$, such that, for all $i=1, \ldots, N$, $s[p_i]$ will be considered a peak (valid or meaningful maximum) if it satisfies both inequalities $$s(p_i) \geq s(t_{i-1}) + \delta^*,$$

$$s(p_i) \geq s(t_{i+1}) + \delta^*. \quad (25)$$

Otherwise, it is considered noise and, hence, discarded. To obtain that threshold, $\delta^*$, a machine-learning algorithm called k-means cluster (Alpaydin, 2010). By means of that algorithm, it is possible to find a number $\delta$ for which that set is partitioned into two disjoint sets, namely: (a) Set $\Delta_1$, which consists of all elements of $\Delta$ that are less than $\delta$; (b) Set $\Delta_2$, which consists of all elements of $\Delta$ that are greater or equal to $\delta$. After the number $\delta$ is obtained, the desired threshold, $\delta^*$, is chosen to be the element of $\Delta$ that is closest to $\delta^*$.

The algorithm is constructed as follows: At first, the (arithmetic) mean, $\alpha$, of all elements in $\Delta$ is calculated. Then, all elements less than $\alpha$ are assigned to set $\Delta_1$, and all elements greater than or equal to a are assigned to set $\Delta_2$. As a next step, the (arithmetic) means, $\alpha_1$ and $\alpha_2$, of the sets $\Delta_1$ and $\Delta_2$, respectively, are calculated. The distances from the elements of $\Delta_1$ and $\alpha_1$, as well as the distances from the elements of $\Delta_2$ and $\alpha_2$, are also calculated. With that information, the subsets $\Delta_1$ and $\Delta_2$ are rearranged (updated) in the following way. For each element of $\Delta$, if its distance $\alpha_1$ is less that its distance to $\alpha_2$, then that element belongs to $\Delta_1$. Otherwise, it belongs to $\Delta_2$. That procedure is then repeated until no further rearrangements are possible. Finally, the selected threshold value will be the lowest one in the set with the highest threshold values.

That explains how peaks are detected for one-dimensional signals. For two-dimensional signals, the above-described peak detection is applied along rows or along columns of the image. However, the most advantageous orientation to perform the peak detection may be along the direction perpendicular to the structure orientation. Since the dominant structure orientation is known, it can be used to rotate the dataset or the peak detection operator and produce an image where all nonessential information has been discarded. The peak detection described above produces an image in which all nonessential information has been discarded. The resulting image has the following characteristics: (a) it is binary, which means that each pixel has value "zero" or "one" and (b) it is sparse, which means that most of the elements are zero. In general embodiments, dominant peaks may be found by a peak detection algorithm using automated global thresholding (e.g., k-means).

Figure 7A:
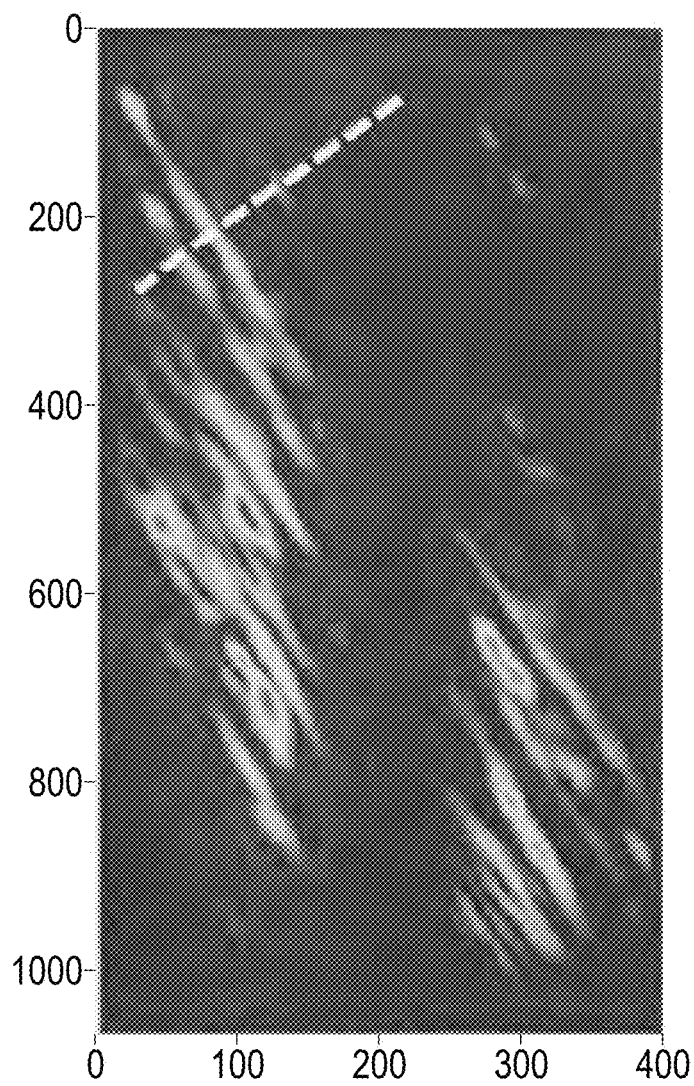
FIGS. 7A-7G illustrate peak detection in accordance with embodiments of the present disclosure.
Figure 7B:
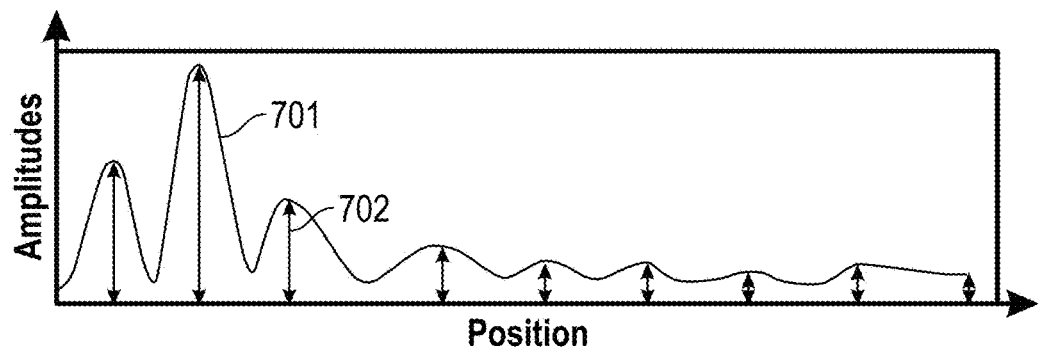
Figure 7C:
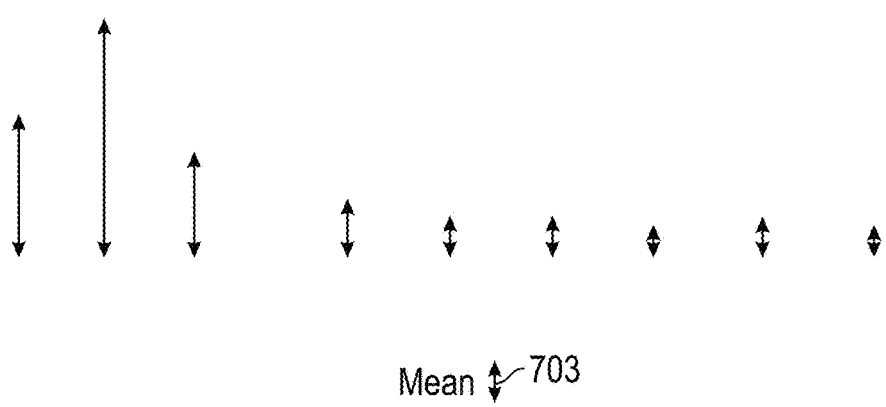
Figure 7D:
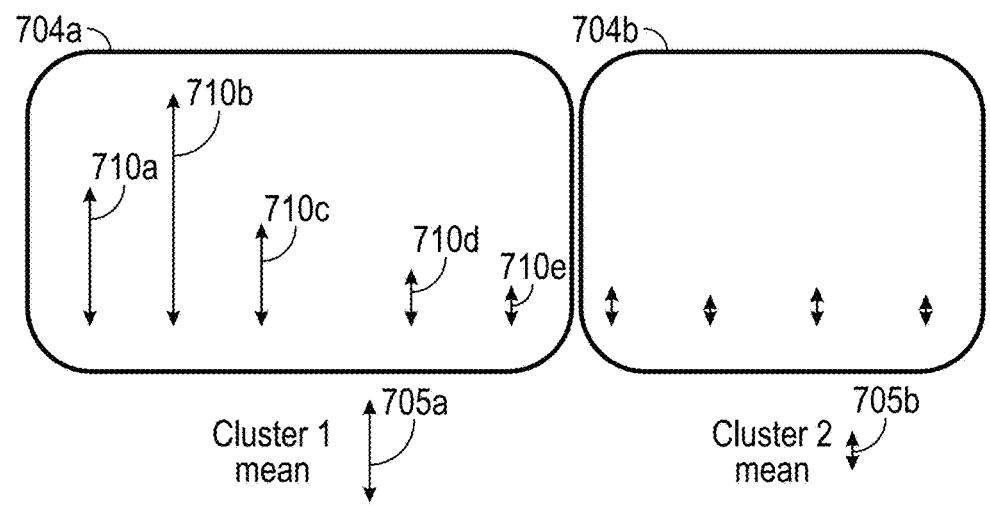
Figure 7E:
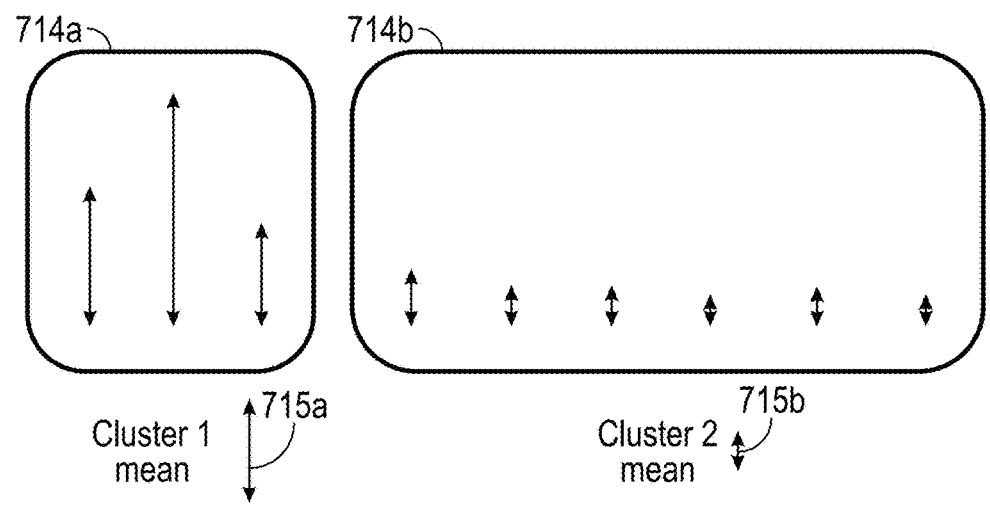
Figure 7F:
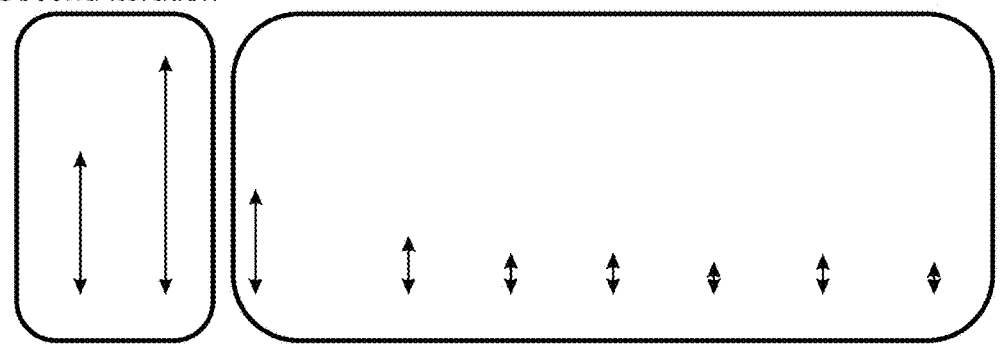
Figure 7G:
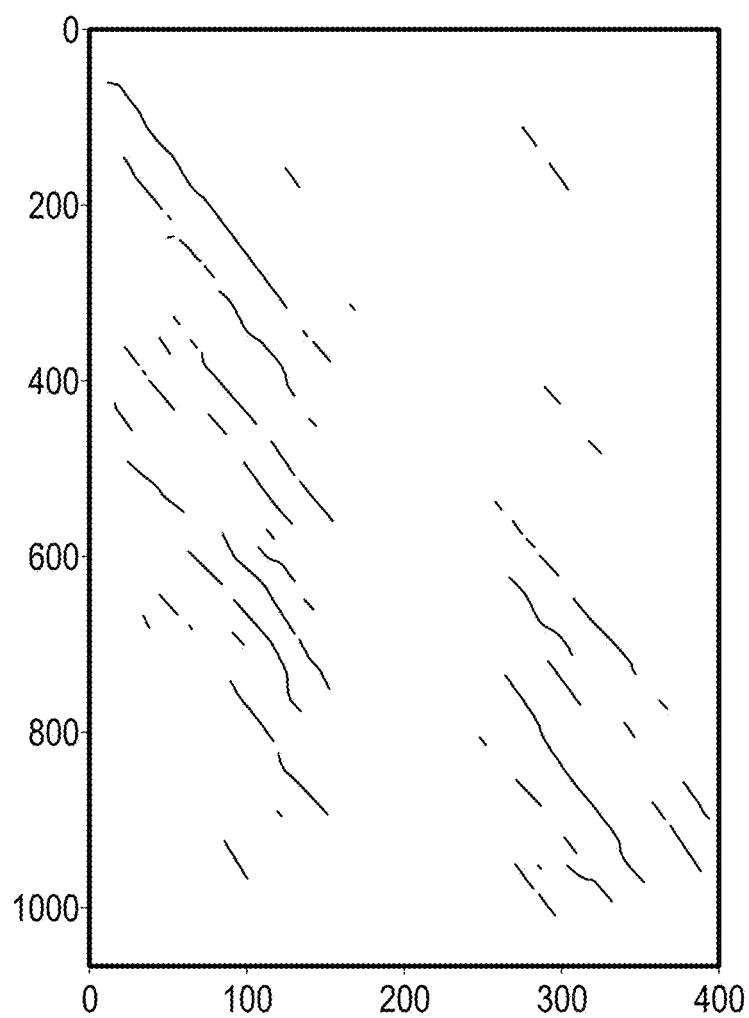

FIGS. 7A-7G illustrate peak detection in accordance with embodiments of the present disclosure. FIG. 7A shows an enveloped 700 image generated from the acoustic reflection image. FIG. 7B shows a curve 701 illustrating amplitude with respect to position. Several candidate peaks 702 are identified, as described above. FIGS. 7C-7F illustrate peak detection via iterative K-means cluster application. Referring to FIG. 7C, a mean 703 is calculated. Referring to FIG. 7D, two initial clusters 704a and 704b are formed with means 705a and 705b, respectively. As described above, for each element 710a-710e (collectively 710) of cluster 1, if its distance to the mean of the cluster is less that its distance to the mean of the neighbor cluster (cluster 2), then that element remains. Otherwise, it is shifted to the other cluster. That procedure is then repeated iteratively. In FIG. 7E, candidates 710d and 710e are shifted in the first iteration, and a new mean 715a and 715b is calculated for each cluster 714a and 714b. Finally, in FIG. 7F, the selected threshold value will be the lowest one in the set with the highest threshold values. FIG. 7G shows a binary image comprising detected peaks.

Aspects of the present disclosure include identifying a set of features in the acoustic reflection image substantially fitting a pattern. In general embodiments, the pattern may be capable of being expressed using a limited parameter set. The pattern may be a line segment pattern.

The Hough transform (Hough, 1962, Duda and Hart, 1972) has a widespread use to detect fractures in electric borehole images (see, e.g., Said, 2014 and references therein). The main idea of the Hough transform is to identify sets of collinear (straight-line) points in the image domain. A straight line is parameterized in several ways, all of them using two parameters. One of them is the so-called normal form $$\rho = x \cos \theta + y \sin \theta. \quad (26)$$

For a fixed parameter pair $(\rho,\theta)$, varying points (x,y) in the image space satisfying Equation (26) describe the straight line for which ($\rho \cos \theta, \rho \sin \theta$) is the normal vector that joins the origin to its interception point at the line. This approach was first proposed by Duda & Hart (1972) to overcome the problem of unboundedness of slope and intercept parameters in the conventional representation of straight lines.

We can readily see that, for a fixed pair (x,y) in image domain and varying pairs $(\rho,\theta)$ in parameter domain, Equation (26) represents a sinusoidal function. A key property of the normal form (26) is that sinusoidal functions in parameter domain that are attached to points lying on a single line in image domain, all intercept at a same point, namely that parameter pair that specifies that single line in image domain. In other words, collinear points in the image domain can be identified when there is a common intersection among their corresponding sinusoids in the parameter domain. As a consequence, the parameter pair that specifies an intersection point of sinusoids defines a straight line in image domain that contains all points that correspond to the intersecting sinusoids. Intersection points in parameter space can be determined by means of an "accumulator function" defined on each (ρ, θ). Such an accumulator is provided in the Hough transform $$H(\rho, \theta) = \sum_{(x,y) \in S} \delta[\rho - \text{int}(x\cos\theta + y\sin\theta)], \quad (27)$$

$$-\pi/2 \le \theta \le \pi/2, \quad -\sqrt{M^2 + N^2} \le \rho \le \sqrt{M^2 + N^2},$$

in which δ[x−α] is the discrete delta function $$\delta[x - a] = \begin{cases} 1, & \text{if } x = a \\ 0, & \text{otherwise} \end{cases}. \quad (28)$$

Here, the bracket notation in(x) indicates the nearest integer to x and S is the set of all non-zero values (i.e., one values) of the input image. In summary, the problem of detecting lines in the image domain is equivalent to detecting peaks in the Hough space. This is because such a peak means a large number of intersections of sinusoids and, consequently, a set of collinear points in the image space.

The most common tool used to detect peaks in the Hough space (parameter domain) is the global threshold method (Illingworth, 1988), in which all peaks above a given threshold identify lines in the image domain. A drawback of that approach is that the presence of a value above the threshold does not necessarily correspond to a meaningful (structural) line in image space. In our case, the most significant situation is that the collinear points are not sufficient (being sparse or not contiguous) to characterize a structural line. In the case detected lines are not of use, are referred to as false detections.

Said (2014) proposed post-processing methods to overcome false detection. Consequently, although Hough transform is a well-known method for line detection, post-processing is needed to deal with the false detection problem, causing computational overhead. In any case, lines are identified for each peak detected in parameter space. For such lines to be meaningful (i.e., associated to geological structures) requires additional requirements. A key observation in that direction is structures should be better identified, not simply as lines, but instead, as line segments, which is implemented through a modified Hough transform.

A first approach to deal with the false line detection issue is to restrict the angle range of the Hough parameters to coincide with the one that refers to the dominant direction, obtained in the filtering process, as described above. This approach can avoid false line detection associated to sparse collinear points in non-desirable orientation and, moreover, saves computational effort.

Angle restriction in parameter space eliminates most of false detected lines. Still it does not prevent collinear points to contribute to more than one peak inside the allowed orientation range. To overcome this contingency, and also to improve the accuracy of the Hough transform, we generalize the approach of applying the Hough transform followed by post-processing (Said 2014) in the following two aspects: (a) introduction of an alternative local version of post-processing into the computation of the Hough transform, and (b) introduction of a new approach for detecting, not simply lines, but line segments.

Figure 8A:
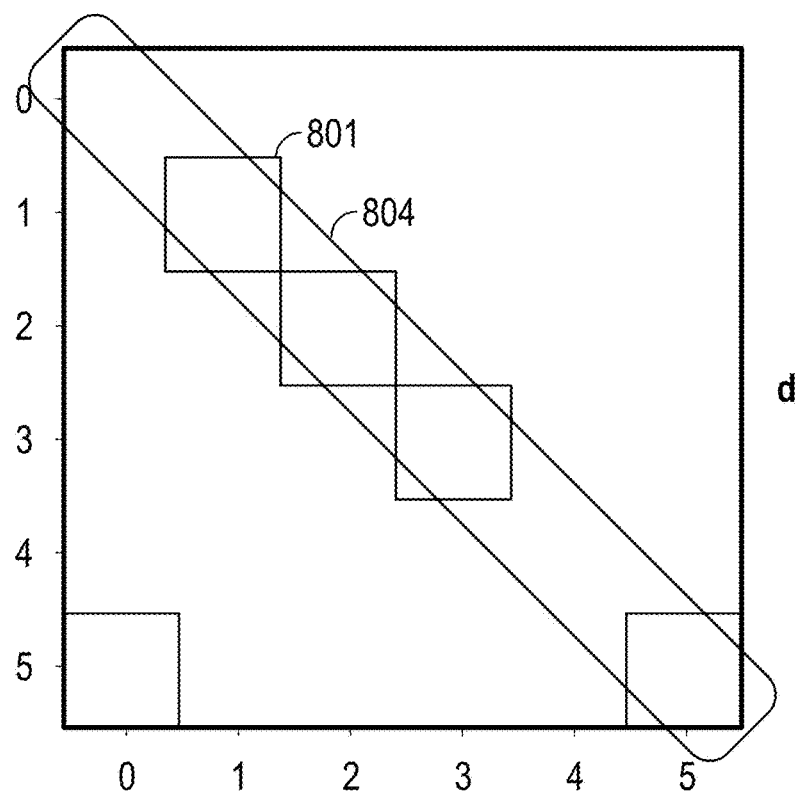
FIGS. 8A-8C illustrate techniques for line pattern detection in accordance with embodiments of the present disclosure.
Figure 8B:
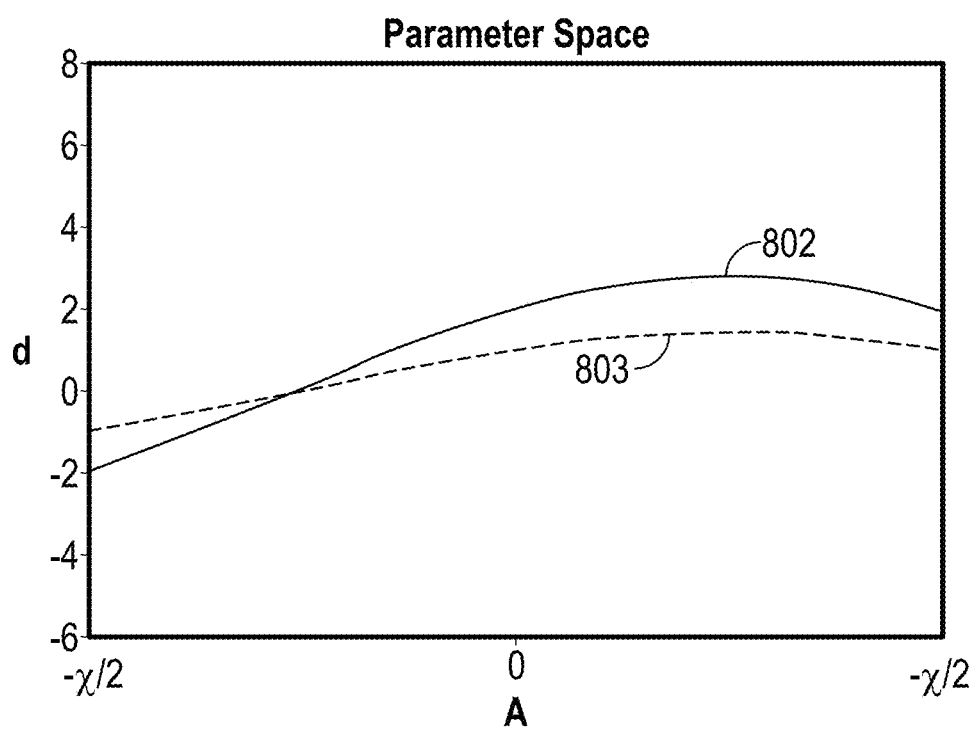
Figure 8C:
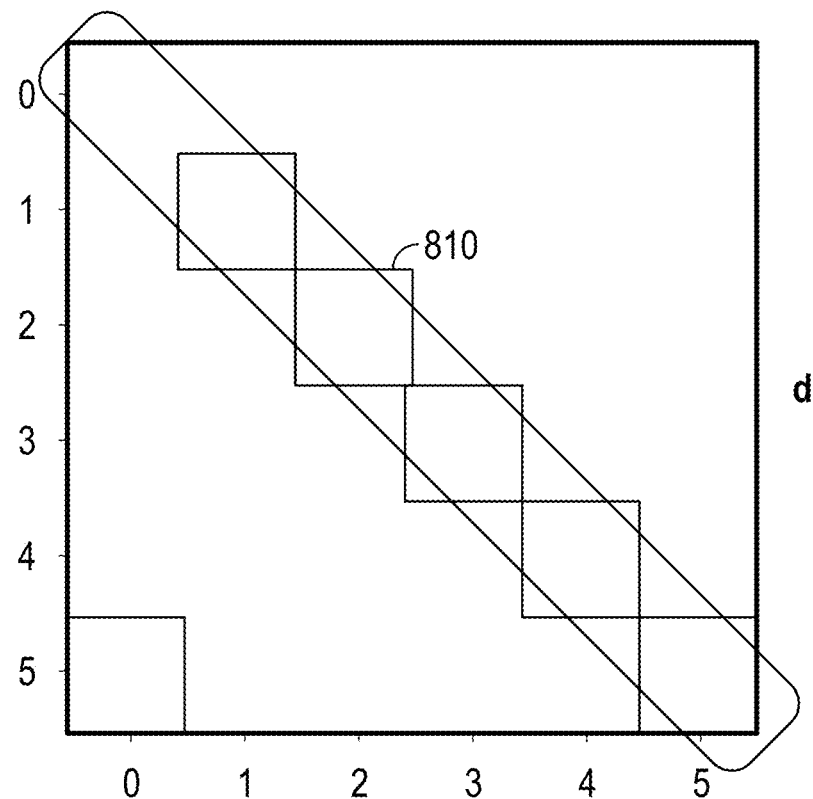

FIGS. 8A-8C illustrate techniques for line pattern detection in accordance with embodiments of the present disclosure. For each image point 801, the Hough transform is computed and the peak in parameter space 802 is detected. If that peak is smaller than the threshold, proceed to the next point. If the peak 802 is greater than the threshold 803, a possible leading line is identified. In this case, the Hough transform is applied only on a corridor 804 defined by the points of the identified leading-line (that line may or may not be a structural line). Next, the corridor is checked for the existence of a segment line, as described in further detail below. If such line segment exists, then the Hough transform of the points belonging to that segment line, and only them, are removed from the parameter space.

In order to detect the existence of a segment line in the corridor, two user-defined parameters may be introduced, namely a gap tolerance and a minimum segment-line length. The gap tolerance is a measure of a maximum distance that can be allowed so that two points are accepted as contiguous. The maximum gap aims to prevent sparse collinear points from being identified as valid lines. The minimum segment-line length quantifies the minimum size of a set of contiguous collinear points to be a valid line segment. Therefore, if in the corridor, a segment of contiguous points (i.e., satisfying the gap tolerance condition) and of acceptable size (i.e., satisfying the condition of minimum segment-line length), that segment is considered as a valid line segment 810. At the present stage, tests are being done to assess the best choices for the two parameters of gap tolerance and minimum segment-line length. Using the Hough transform, structures can be better identified by segment lines, instead of full lines, and the case of false line detection is better mitigated. Beneficially the line segment may be represented using a small parameter set 812, such as, for example, coordinates corresponding to the endpoints of the segment.

Figure 10A:
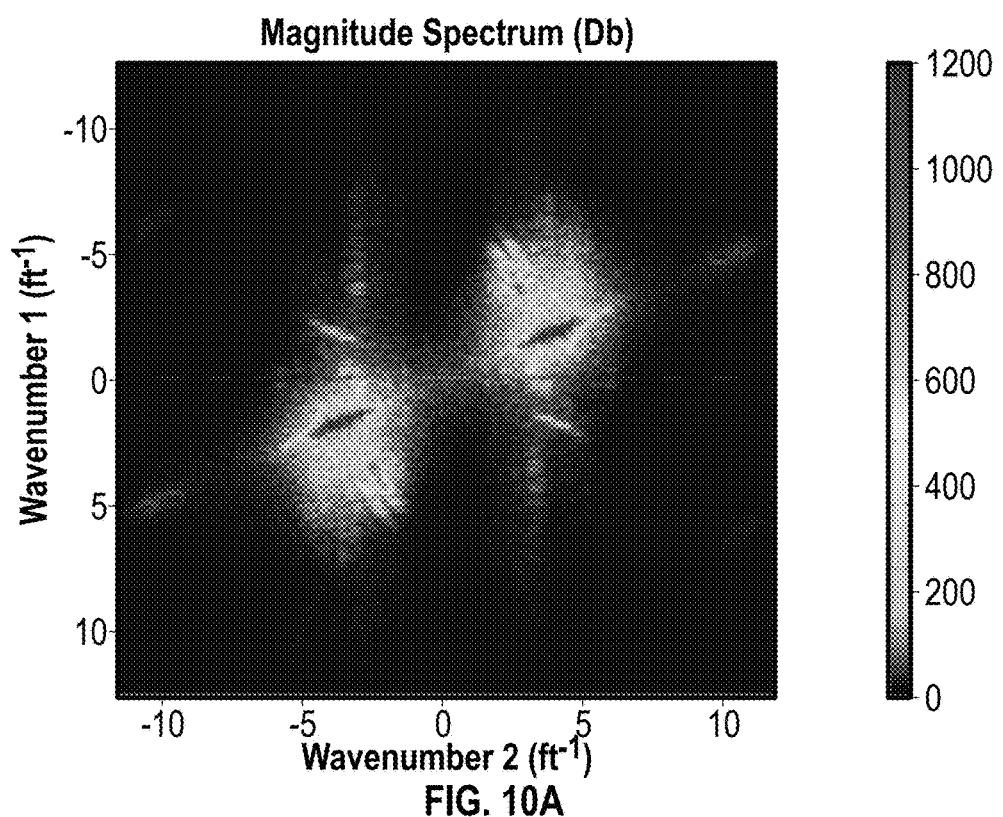
FIGS. 10A-10C show the magnitude spectrum of the Fourier transform for each version of images.
Figure 10B:
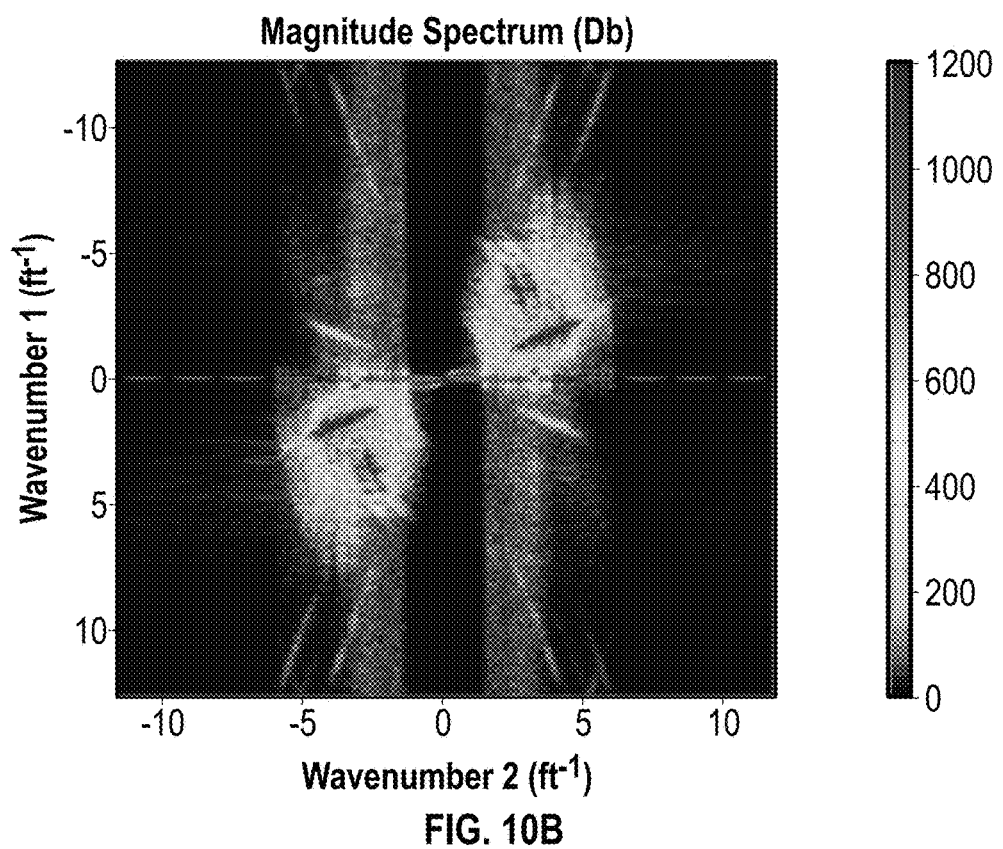
Figure 10C:
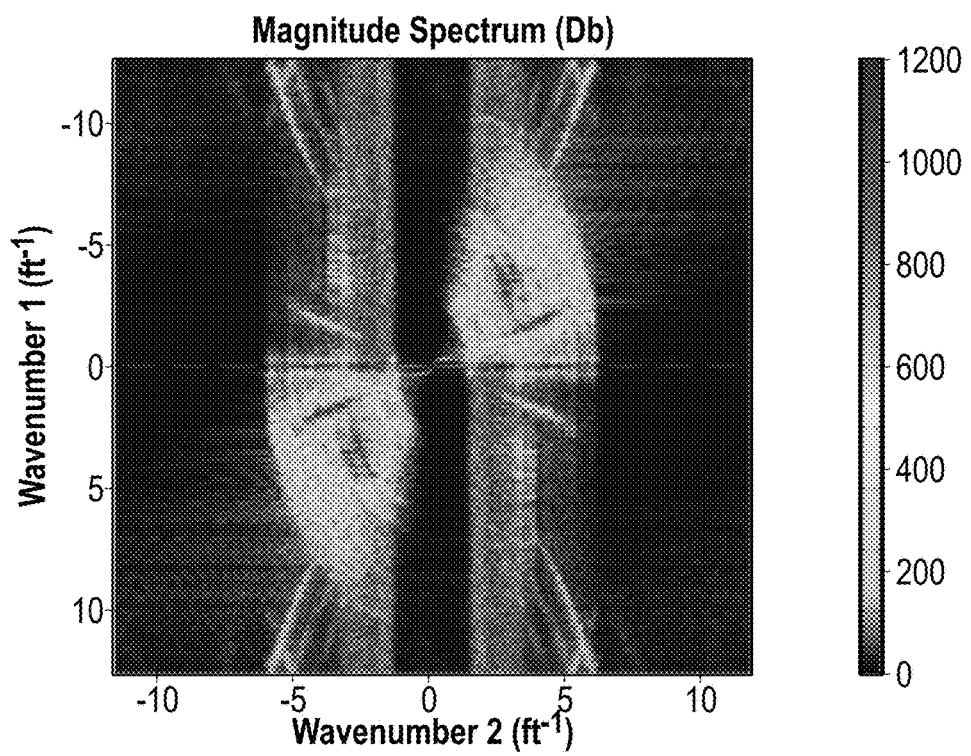
Figure 11A:
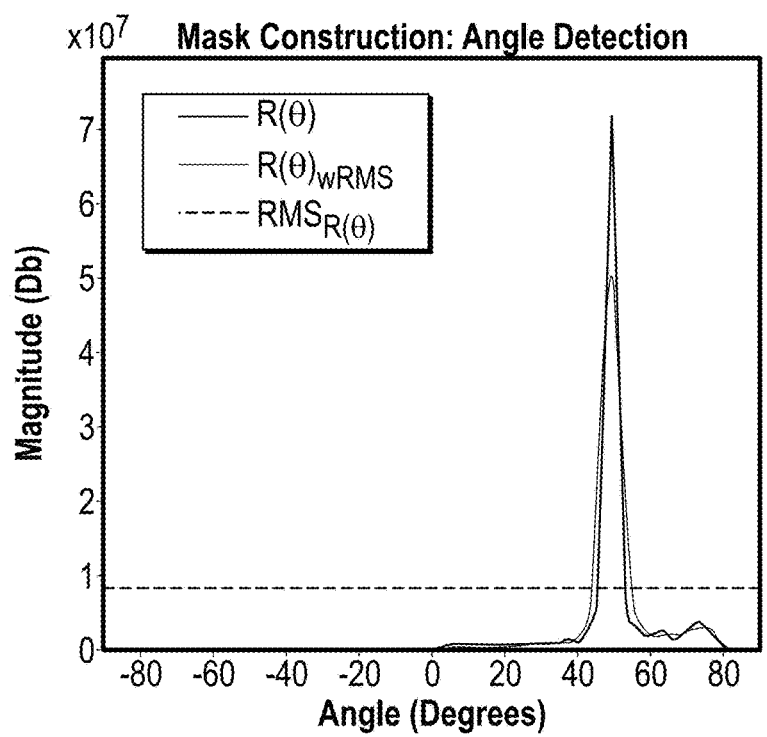
FIGS. 11A-11C show aperature angle detection for each version of images.
Figure 11B:
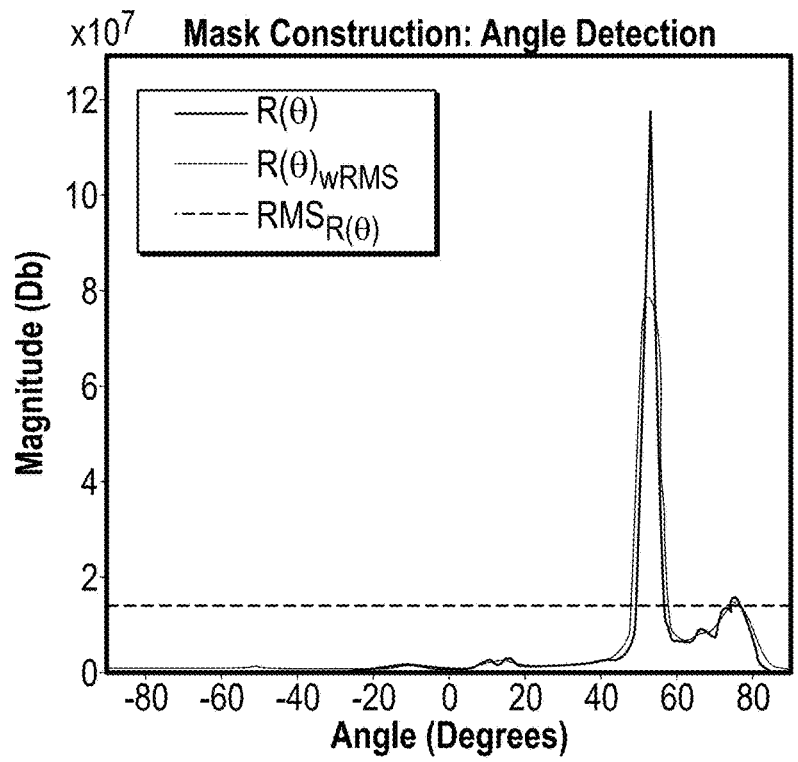
Figure 11C:
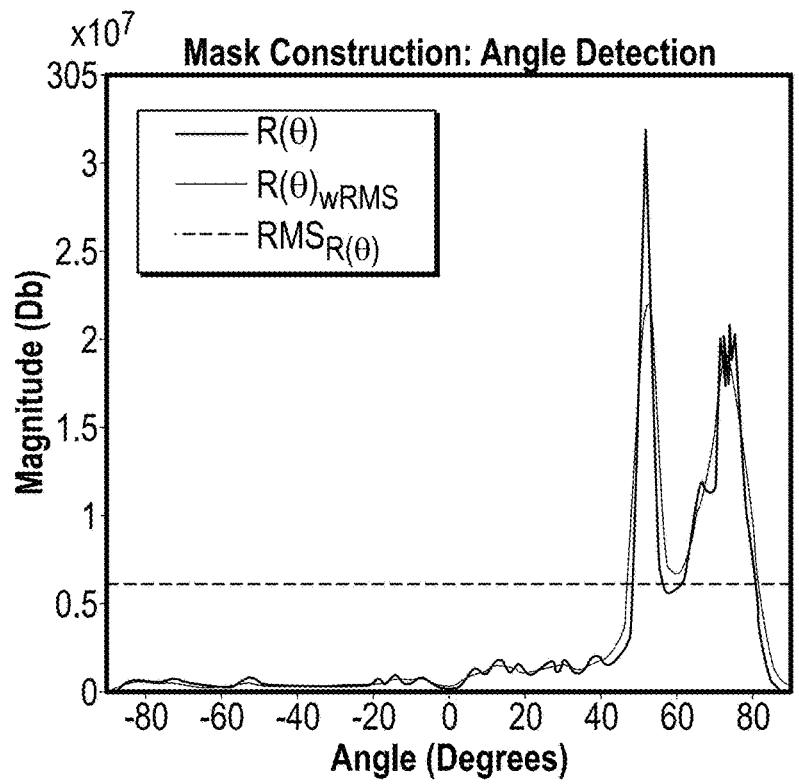

FIGS. 9A-9C illustrates acoustic reflection images 901a, 901b, and 901c, respectively, resulting from three variations in pre-processing technique for a dataset presenting dipping events. As will become apparent, acoustic pre-processing can influence the aperture angle detection. FIGS. 10A-10C show the magnitude spectrum of the Fourier transform (see Equation 4a) for each version of images 901a, 901b and 901c. FIGS. 11A-11C show aperature angle detection for each version of images 901a, 901b and 901c. The dominant orientation can be easily identified by the highest value amplitude in an elongated denser region, as well for the aperture angle detection. Also, high amplitudes distributed in the neighborhood of these regions can be observed. These amplitudes are related to migration artifacts, e.g., footprints of removed waves and noises.

Figure 12A:
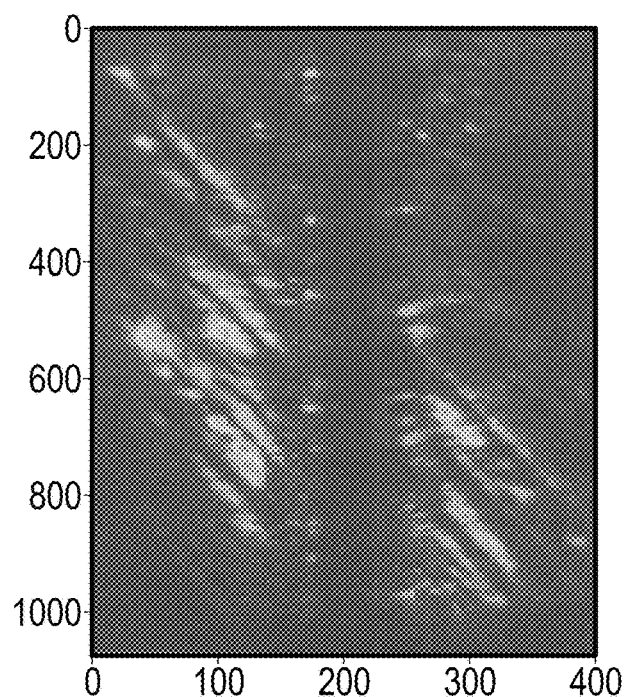
FIGS. 12A & 12B illustrate envelopes of image without and with filtering, respectively.
Figure 12B:
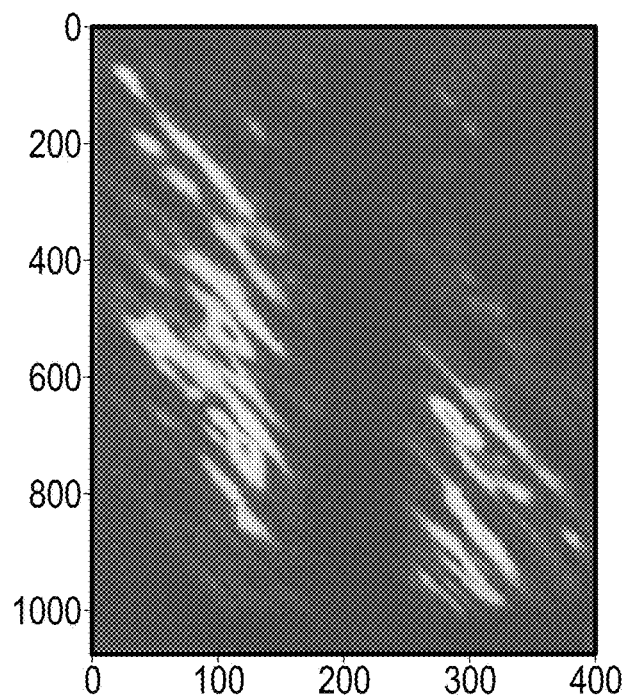
Figure 13A:
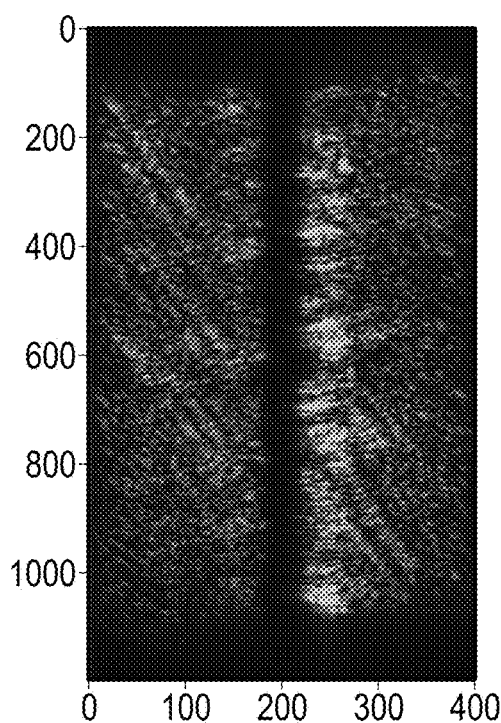
FIGS. 13A & 13B illustrate envelopes of image without and with filtering, respectively.
Figure 13B:
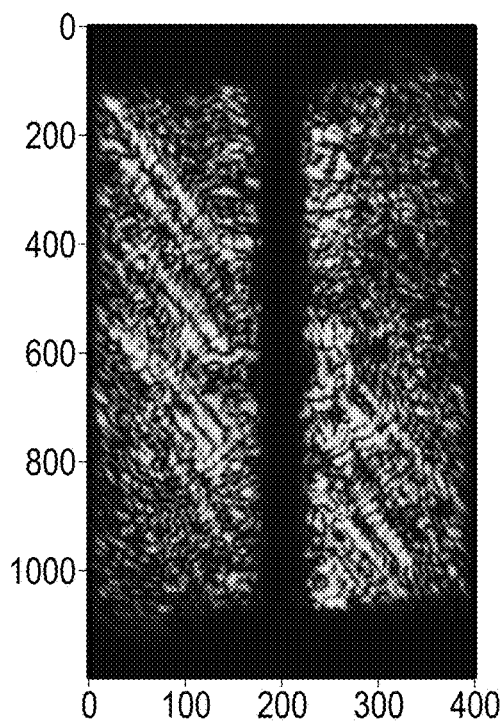

FIGS. 12A & 12B illustrate envelopes of image 901a without and with filtering, respectively. FIGS. 13A & 13B illustrate envelopes of image 901c without and with filtering, respectively. Clearly shown is the ability of the envelope to highlight the meaningful structures. However, as discussed above, the filter efficiency is related with the acoustic pre-processing of the LWD image. This can be seen in the envelope of the image 901c. Although the envelope has improved with the filter, the presence of noise overshadows the envelope use.

Figure 14A:
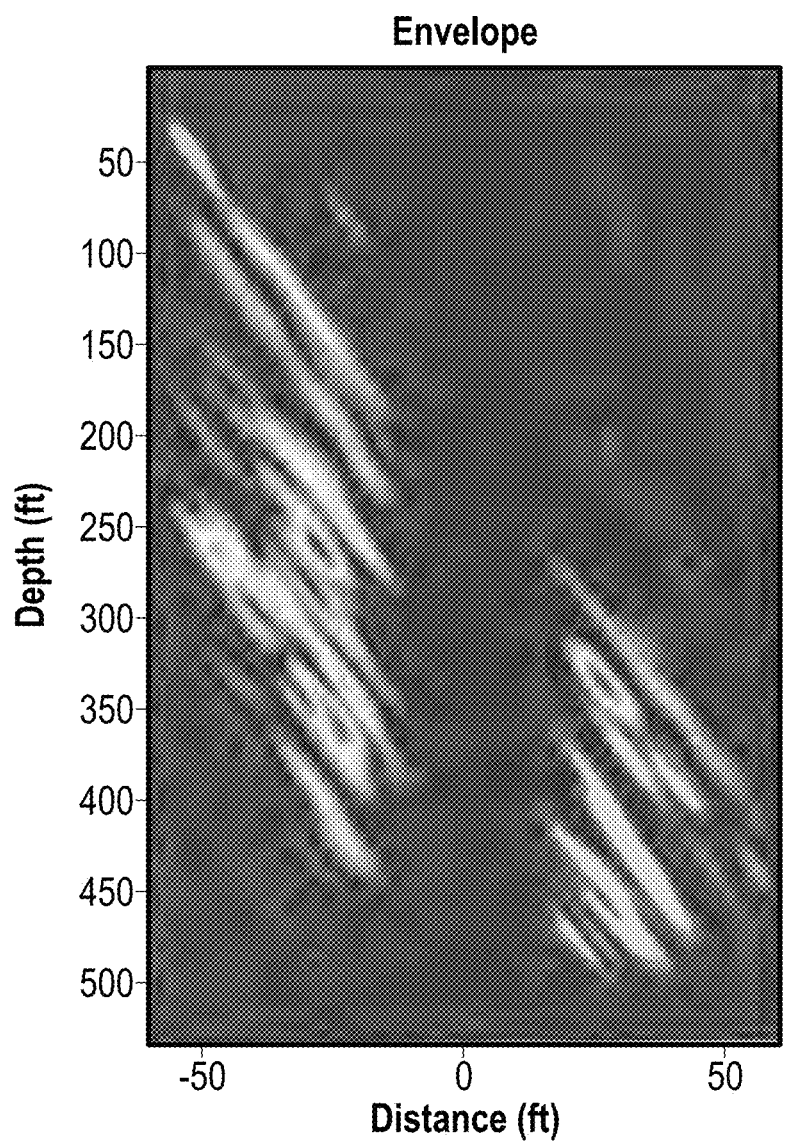
FIGS. 14A-14C illustrate peak detection of a processed acoustic reflection image.
Figure 14B:
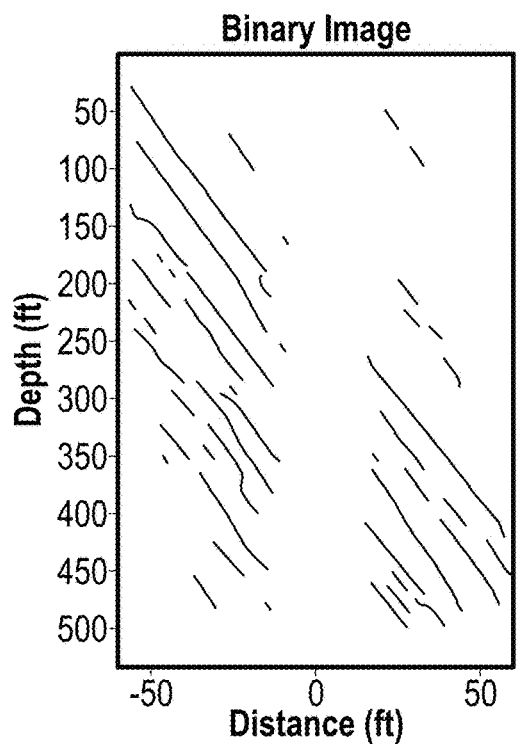
Figure 14C:
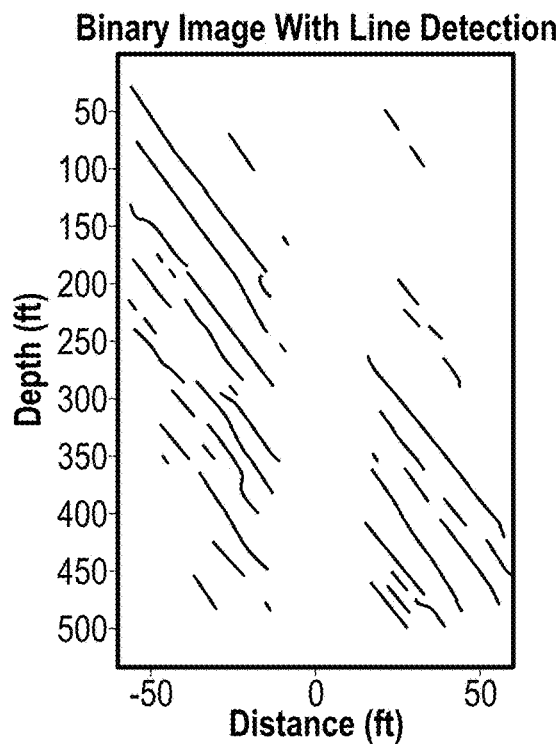

FIGS. 14A-14C illustrate peak detection of a processed acoustic reflection image 901a. FIG. 14A illustrates the enveloped image corresponding to 901a. FIG. 14B illustrates the binary image generated in accordance with embodiments of the present disclosure. FIG. 14C illustrates detected line segments within the binary image. The refined Hough transform was applied to the binary image, and with the resulting parameter set the detected segment lines were plotted over the respective binary image. For image 901a, which presents one well-defined dominant orientation, the segment lines detected were well-fit to the binary image.

The resulting image from peak detection is a binary image. That is, each pixel has value "0" or "1", which can be represented by one bit. Moreover each (gray-scale) pixel is represented by 8 bits. If we consider an original image with 200×400 pixels, which corresponds to a dataset of 640,000 bits, the size of the peak image will be reduced to 80,000 bits. Moreover, the binary image is sparse, i.e., there are many more "zeros" than "ones." This means that the binary image has significant redundancy. As a consequence, lossless compression will significantly reduce data size. As one example, a Lempel-Ziv-Markov chain algorithm (LZMA) (Salomon et al., 2010) may be applied to the binary image. This algorithm was chosen because it provides high compression, fast decompression and is implemented in most of available compression software. Concerning quality, binary images are almost always superior. Thus, in some instances, direct conventional compression of the binary image may be recommended by particular advantages over full compression as described herein. In some cases, however, their size can be too large for effective transmission.

Of course, in many applications, full smart compression using pattern detection will be preferable. Line-segment images are always smaller, but have the limitation of producing good results only in the case of single or similar dominant orientations. The discussion herein have focused on images with target images of sizes 200×400 pixels (640,000 bits). Applying these techniques to the resulting binary image from image 901a, the ensemble of previously-detected peaks is partitioned into approximate continuous, line-segment subsets. The parameters of one line segment may specify the positions of its two extreme points. Moreover, each of these extreme points may be defined by two values, individually represented by 16 bits. As a consequence, each line segment may be parameterized by 64 bits. The 64 bit parameter size is, of course, only an example. The size of the parameterized image depends on how many line segments have been identified in the binary image, the resolution of the image, and many other factors. The parameter representation of the line segment pattern may also be further compressed before transmission to the surface.

Table 2 summarizes the transmission effectiveness which relates to binary image with lossless compression and the segment-line set situations. Two different operation cases are considered, namely with transmission rates of 5 and 2 bits/sec. Testing a variety of images, different scenarios were considered: (1) "minimum", representing the image of smallest size; (2) "mean", representing the average size of all images and (3) "maximum", representing the image of largest size. We see that in all cases, compressed binary images exhibit larger images sizes (and, of course, longer transmission times) than their counterpart line-segment sets. In all cases and transmission rates, line-segment sets were transmitted in less than an hour. For a transmission rate of 5 bits/sec, compressed binary images achieved, in all cases, transmission in less than an hour.

TABLE 2

|  | Scenarios | Size (bytes) | 2 (bits/sec) | 5 (bits/sec) |
| --- | --- | --- | --- | --- |
| Compressed Binary Image | Minimum | 228 | 0.25 hours | 0.10 hours |
|  | Mean | 1020 | 1.13 hours | 0.45 hours |
|  | Maximum | 1684 | 1.87 hours | 0.74 hours |
| Line-segment set | Minimum | 96 | 0.10 hours | 0.04 hours |
|  | Mean | 354 | 0.39 hours | 0.15 hours |
|  | Maximum | 668 | 0.74 hours | 0.30 hours |

Figure 15:
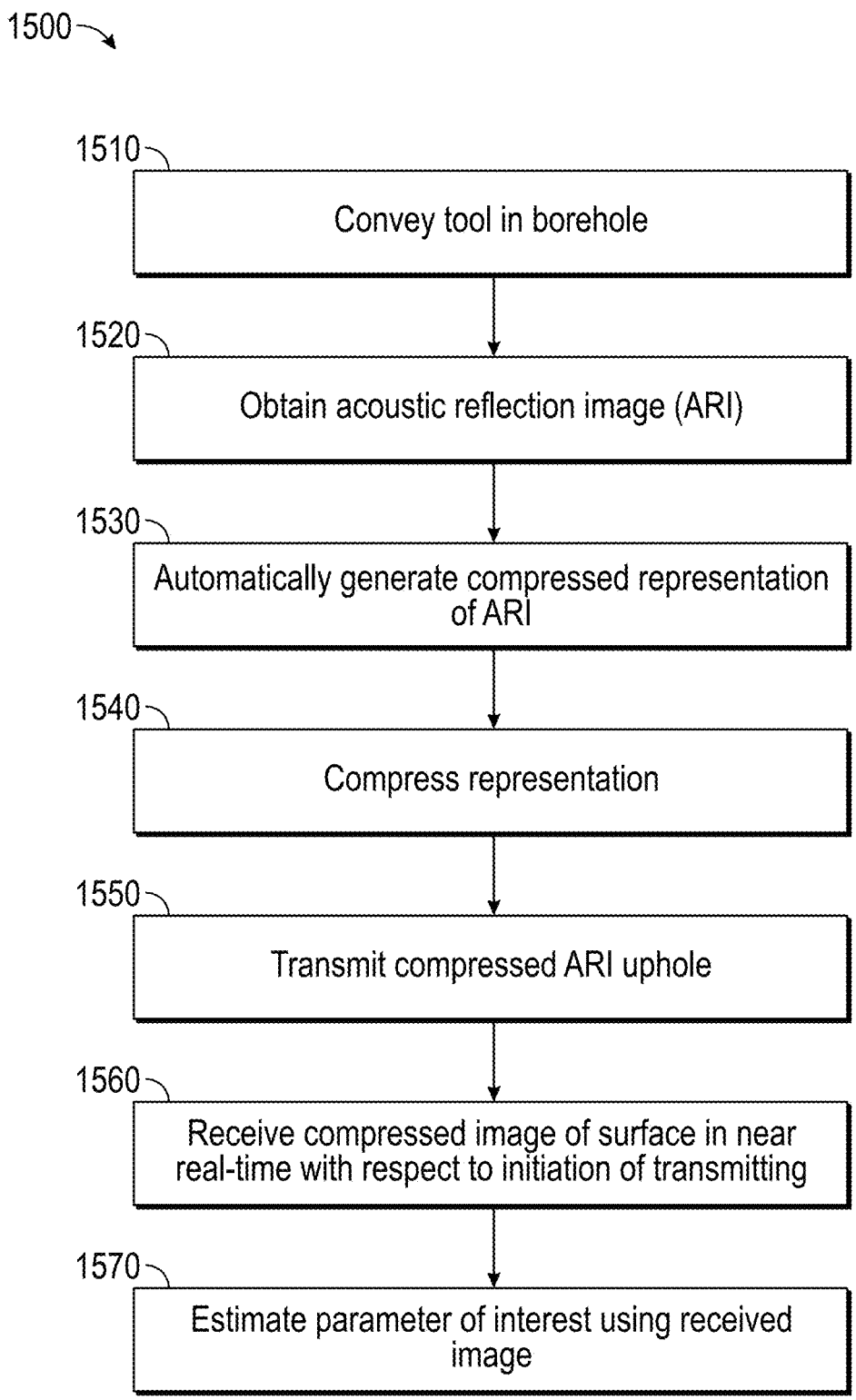
FIG. 15 shows a flow chart illustrating methods for performing well logging in a borehole intersecting an earth formation in accordance with embodiments of the present disclosure.

FIG. 15 shows a flow chart 1500 illustrating methods for performing well logging in a borehole intersecting an earth formation in accordance with embodiments of the present disclosure. In optional step 1510, an acoustic well logging tool is conveyed in a borehole using a carrier. The borehole may be filled with downhole fluid.

Optional step 1520 of the method 1500 may include obtaining the acoustic reflection image with the acoustic well logging tool. Step 1520 may include emitting an acoustic wave and using at least one sensor to produce information responsive to a reflection of the emitted wave. In some embodiments, step 1520 may include emitting a wave toward each of a plurality of azimuthally distributed orientations about a bottom hole assembly (BHA).

Step 1530 comprises automatically generating a compressed representation of an acoustic reflection image. Optional step 1540 comprises further compressing the representation, such as, for example, by using conventional lossless compression processing. Optional step 1550 comprises transmitting the compressed acoustic reflection image uphole. Optional step 1560 comprises receiving the compressed image at the surface in near real-time with respect to initiation of the transmitting. Optional step 1570 comprises estimating a parameter of interest of the formation using the received image. Step 1570 may comprises decoding the received compressed image, if further conventional compression had been performed on the representation. The estimation may be performed in multiple stages, such that an earlier stage may process the information for a later stage.

Figure 16:
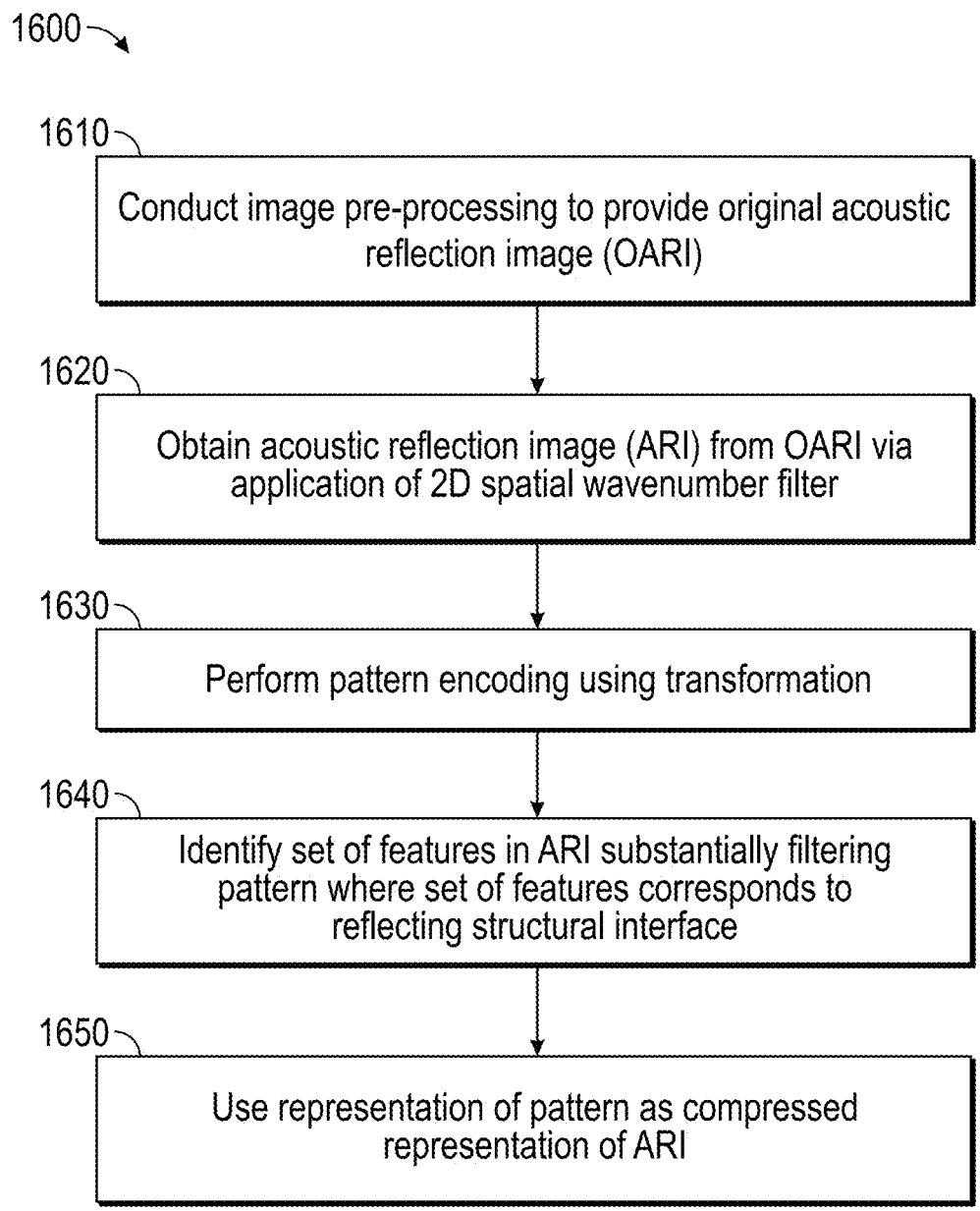
FIG. 16 shows a flow chart illustrating methods for automatically generating a compressed representation of an acoustic reflection image in accordance with embodiments of the present disclosure.

FIG. 16 shows a flow chart 1600 illustrating methods for automatically generating a compressed representation of an acoustic reflection image in accordance with embodiments of the present disclosure. In optional step 1610, pre-processing is conducted on an image to provide an original acoustic reflection image. In optional step 1620, an acoustic reflection image is obtained from the original acoustic reflection image via the application of a 2-D spatial wavenumber filter automatically generated as a polar segment within the 2-D spatial wavenumber amplitude spectrum of at least a portion of the original acoustic reflection image, and wherein an azimuthal orientation of the polar segment defines the determined strike. At optional step 1630, a pattern, which may be a line segment obtained from amplitude peaks, is encoded by at least one of: i) a Hough transformation; ii) a modification of the Hough transformation.

Step 1640 comprises identifying a set of features in the acoustic reflection image substantially fitting the pattern, wherein the set of features corresponds to a portion of at least one reflecting structural interface of the formation. Identifying the set of features may include determining an envelope of the acoustic reflection image in a determined strike direction, finding dominant peaks in the envelope, and generating a binary image of the amplitude peaks. The dominant peaks may be found by a peak detection algorithm using automated global thresholding. Step 1650 comprises using a representation of the pattern as the compressed representation of the acoustic reflection image.

Optional methods may include using the parameter of interest to estimate a characteristic of a formation. Estimation of the parameter may include the use of a model. In some embodiments, the model may include, but is not limited to, one or more of: (i) a mathematical equation, (ii) an algorithm, (iii) an deconvolution technique, and so on. Reference information accessible to the processor may also be used.

Method embodiments may include conducting further operations in the earth formation in dependence upon acoustic reflection image, the logs, estimated parameters, or upon models created using ones of these. The further operations may include at least one of: i) geosteering; ii) drilling additional boreholes in the formation; iii) performing additional measurements on the formation; iv) estimating additional parameters of the formation; v) installing equipment in the borehole; vi) evaluating the formation; vii) optimizing present or future development in the formation or in a similar formation; viii) optimizing present or future exploration in the formation or in a similar formation; ix) drilling the borehole; and x) producing one or more hydrocarbons from the formation information.

Estimated parameters of interest may be stored (recorded) as information or visually depicted on a display. The parameters of interest may be transmitted before or after storage or display. For example, information may be transmitted to other downhole components or to the surface for storage, display, or further processing. Aspects of the present disclosure relate to modeling a volume of an earth formation using the estimated parameter of interest, such as, for example, by associating estimated parameter values with portions of the volume of interest to which they correspond. The model of the earth formation generated and maintained in aspects of the disclosure may be implemented as a representation of the earth formation stored as information. The information (e.g., data) may also be transmitted, stored on a non-transitory machine-readable medium, and/or rendered (e.g., visually depicted) on a display.

The processing of the measurements by a processor may occur at the tool, the surface, or at a remote location. The data acquisition may be controlled at least in part by the electronics. Implicit in the control and processing of the data is the use of a computer program on a suitable non-transitory machine readable medium that enables the processors to perform the control and processing. The non-transitory machine readable medium may include ROMs, EPROMs, EEPROMs, flash memories and optical disks. The term processor is intended to include devices such as a field programmable gate array (FPGA).

The term "conveyance device" as used above means any device, device component, combination of devices, media and/or member that may be used to convey, house, support or otherwise facilitate the use of another device, device component, combination of devices, media and/or member. Exemplary non-limiting conveyance devices include drill strings of the coiled tube type, of the jointed pipe type and any combination or portion thereof. Other conveyance device examples include casing pipes, wirelines, wire line sondes, slickline sondes, drop shots, downhole subs, BHA's, drill string inserts, modules, internal housings and substrate portions thereof, self-propelled tractors. As used above, the term "sub" refers to any structure that is configured to partially enclose, completely enclose, house, or support a device. The term "information" as used above includes any form of information (Analog, digital, EM, printed, etc.). The term "processor" or "information processing device" herein includes, but is not limited to, any device that transmits, receives, manipulates, converts, calculates, modulates, transposes, carries, stores or otherwise utilizes information. An information processing device may include a microprocessor, resident memory, and peripherals for executing programmed instructions. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on. Thus, a processor may be configured to perform one or more methods as described herein, and configuration of the processor may include operative connection with resident memory and peripherals for executing programmed instructions.

As used herein, the term "fluid" and "fluids" refers to one or more gasses, one or more liquids, and mixtures thereof. A "downhole fluid" as used herein includes any gas, liquid, flowable solid and other materials having a fluid property and relating to hydrocarbon recovery. A downhole fluid may be natural or man-made and may be transported downhole or may be recovered from a downhole location. Non-limiting examples of downhole fluids include drilling fluids, return fluids, formation fluids, production fluids containing one or more hydrocarbons, engineered fluids, oils and solvents used in conjunction with downhole tools, water, brine, and combinations thereof. An "engineered fluid" may be used herein to mean a human made fluid formulated for a particular purpose.

While the foregoing disclosure is directed to the one mode embodiments of the disclosure, various modifications will be apparent to those skilled in the art. It is intended that all variations be embraced by the foregoing disclosure.

What is claimed is:

1. A method for performing well logging in a borehole intersecting an earth formation, the method comprising:
    obtaining an acoustic reflection image by:
        generating waves that radiate away from the borehole into the formation, and
        detecting reflections of the waves from at least one structural interface from outside the borehole traveling from the formation to the borehole,
    the acoustic reflection image including the at least one reflecting structural interface of the formation;
    automatically generating a compressed representation of the acoustic reflection image by:
        identifying a set of features in the acoustic reflection image substantially fitting a pattern, wherein the set of features corresponds to a portion of the at least one reflecting structural interface of the formation; and
        using a representation of the pattern as the compressed representation of the acoustic reflection image; and
    transmitting the compressed representation uphole.

2. The method of claim 1 wherein the features are amplitude peaks in the acoustic reflection image, and the pattern is a line segment therein that is obtained from the amplitude peaks.

3. The method of claim 2 wherein identifying the set of features comprises generating a binary image of the amplitude peaks.

4. The method of claim 2 wherein the pattern is encoded by at least one of: i) a Hough transformation; ii) a modification of the Hough transformation.

5. The method of claim 2 wherein identifying the set of features in the acoustic reflection image substantially fitting the pattern comprises determining an envelope of the acoustic reflection image in a determined strike direction and finding dominant peaks in the envelope.

6. The method of claim 5 where the dominant peaks are found by a peak detection algorithm using automated global thresholding.

7. The method of claim 5 wherein the acoustic reflection image is obtained from an original acoustic reflection image via the application of a 2-D spatial wavenumber filter automatically generated as a polar segment within the 2-D spatial wavenumber amplitude spectrum of at least a portion of the original acoustic reflection image, and wherein an azimuthal orientation of the polar segment defines the determined strike.

8. The method of claim 1, wherein the acoustic reflection image is obtained from an original acoustic reflection image via the application of a 2-D spatial wavenumber filter.

9. The method of claim 1 wherein the representation of the pattern results from conventional compression of an initial representation of the pattern.

10. The method of claim 1 comprising receiving the compressed representation at the surface in near real-time with respect to initiation of the transmitting.

11. The method of claim 1 comprising obtaining the acoustic reflection image with a low-frequency acoustic well logging tool.

12. A method for performing well logging in a borehole intersecting an earth formation, the method comprising:
    obtaining an acoustic reflection image by:
        generating waves that radiate away from the borehole into the formation, and
        detecting reflections of the waves from at least one structural interface from outside the borehole traveling from the formation to the borehole,
    the acoustic reflection image including the at least one reflecting structural interface of the formation;
    automatically generating a compressed representation of an acoustic reflection image in the borehole by:
        identifying a set of features in the acoustic reflection image by characterizing portions of the image meeting at least one predefined characteristic as a first type and characterizing all other portions of the image failing to meet the at least one predefined characteristic as a second type, wherein the set of features corresponds to a portion of the at least one reflecting structural interface; and
        generating a binary image by representing the first type with first regions of the image and representing the second type with second regions of the image; and
        using a representation of the binary image as the compressed representation of the acoustic reflection image;
    transmitting the compressed representation uphole.

13. The method of claim 12 wherein the at least one predefined characteristic comprises an amplitude peak.

14. A well logging system for logging in a borehole intersecting an earth formation, the apparatus comprising:
    an acoustic logging tool configured to be conveyed into a borehole;
    a transmitter on the tool configured for generating waves that radiate away from the borehole into the earth formation;
    at least one receiver on the tool configured for detecting reflections of the waves from at least one structural interface from outside the borehole traveling from the earth formation back to the borehole; and
    at least one processor on the tool configured to generate an acoustic reflection image from the signal, the acoustic reflection image including the at least one reflecting structural interface of the formation, and automatically generate a compressed representation of the acoustic reflection image by:
        identifying a set of features in the acoustic reflection image substantially fitting a pattern, wherein the set of features corresponds to a portion of the at least one reflecting structural interface of the formation; and
        using a representation of the pattern as the compressed representation of the acoustic reflection image; and
    a telemetry unit configured to transmit the compressed representation uphole.

15. The well logging system of claim 14 wherein the features are amplitude peaks in the acoustic reflection image, and the pattern is a line segment therein that is obtained from the amplitude peaks.

16. The well logging system of claim 15 wherein the at least one processor is configured to identify the set of features by generating a binary image of the amplitude peaks.

17. The well logging system of claim 15 wherein the pattern is encoded by at least one of: i) a Hough transformation; ii) a modification of the Hough transformation.

18. The well logging system of claim 15 wherein the at least one processor is configured to identify the set of features in the acoustic reflection image substantially fitting the pattern by determining an envelope of the acoustic reflection image in a determined strike direction and finding dominant peaks in the envelope.

19. The method of claim 1 comprising obtaining the acoustic reflection image with at least one of: i) a monopole acoustic well logging tool, and ii) a dipole acoustic well logging tool; iii) a quadrupole acoustic well logging tool.

20. The method of claim 14 wherein the representation of the pattern results from conventional compression of an initial representation of the pattern.

21. A method for performing well logging in a borehole intersecting an earth formation, the method comprising:
    obtaining an acoustic reflection image by:
        generating waves that radiate away from the borehole into the formation, and
        detecting reflections of the waves from at least one structural interface from outside the borehole traveling from the formation to the borehole,
    the acoustic reflection image including the at least one reflecting structural interface of the formation;
    automatically generating a compressed representation of the acoustic reflection image by:
        identifying a set of features in the acoustic reflection image substantially fitting a line segment pattern, wherein the set of features corresponds to a portion of the at least one reflecting structural interface of the formation; and
        using a representation of the line segment pattern as the compressed representation of the acoustic reflection image; and
    transmitting the compressed representation uphole.

* * * * *